United States Patent [19]

Sugita et al.

[11] Patent Number: 5,365,301
[45] Date of Patent: Nov. 15, 1994

[54] DRIVING FORCE TRANSMISSION MECHANISM

[75] Inventors: Yukihiko Sugita, Hachioji; Hiroshi Terada, Mitaka; Takao Nishida, Urawa, all of Japan

[73] Assignee: Olympus Optical Co., Ltd., Tokyo, Japan

[21] Appl. No.: 33,288

[22] Filed: Mar. 17, 1993

[30] Foreign Application Priority Data

| Mar. 17, 1992 | [JP] | Japan | 4-060548 |
| Jun. 29, 1992 | [JP] | Japan | 4-171066 |
| Sep. 28, 1992 | [JP] | Japan | 4-258556 |
| Oct. 7, 1992 | [JP] | Japan | 4-268878 |

[51] Int. Cl.⁵ ............ G03B 1/18; G03B 3/10
[52] U.S. Cl. ............ 354/400; 74/353; 74/354; 354/173.1; 354/195.1; 354/214; 475/12
[58] Field of Search ............ 74/353, 354; 354/173.1, 354/195.1, 214, 400; 475/12

[56] References Cited

U.S. PATENT DOCUMENTS

| 1,848,315 | 3/1932 | Cage | 74/353 X |
| 3,686,974 | 8/1972 | Little, Jr. | 74/354 X |
| 4,717,364 | 1/1988 | Furukawa | 74/353 X |
| 5,168,295 | 12/1992 | Yoshihara et al. | 354/173.1 |

FOREIGN PATENT DOCUMENTS

| 154547 | 9/1982 | Japan | 74/354 |
| 1-287547 | 11/1989 | Japan | |
| 3-81750 | 4/1991 | Japan | |

Primary Examiner—Allan D. Herrmann
Attorney, Agent, or Firm—Louis Weinstein

[57] ABSTRACT

A driving force transmission mechanism and method according to the present invention transmits the driving force of a single motor selectively to a plurality of driven gears, comprising a sun gear rotated either in a forward or reverse direction by the motor, a planetary gear engaging the sun gear, and a plurality of driven gears arranged along the revolution orbit of the planetary gear. A driven gear with which the planetary gear is desired to engage is selected by rotating the sun gear in one direction. The driving force is transmitted to the selected driven gear via the planetary gear by rotation of the sun gear in the opposite direction. The proper gear is selected by use of a sensor. Using the driving force transmission mechanism, various driving systems can be driven by a single motor without the need for a complex switching mechanism. The transmission mechanism may use more than one planetary gear and may use more than one planetary gear assembly.

41 Claims, 16 Drawing Sheets

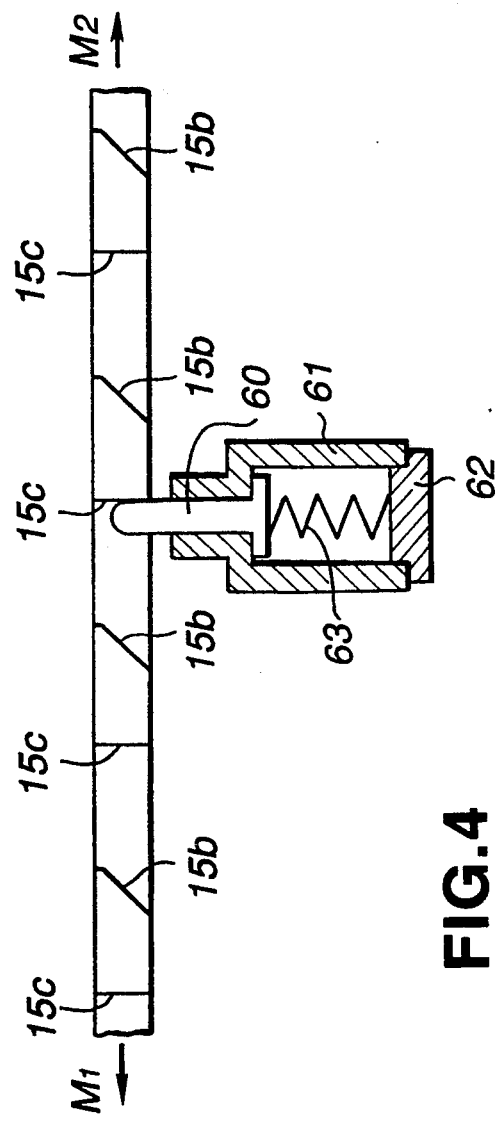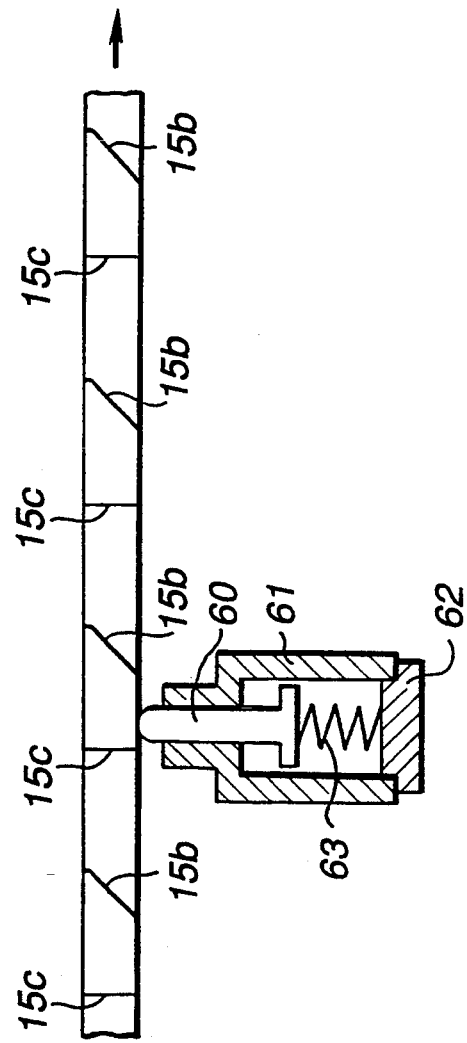

DRIVING FORCE TRANSMISSION MECHANISM

BACKGROUND OF THE INVENTION

1. Field of the Invention

The present invention relates to a driving force transmission mechanism. More particularly, this invention is concerned with a driving force transmission mechanism for a camera that uses a single motor to perform multiple driving operations; such as, film wind, film rewind, frame zoom drive, and focusing drive.

2. Description of the Related Art

In a camera having a known driving force transmission mechanism that drives the driving systems for, for example, film wind, film rewind, and frame zoom, a user operates an operation button or an operation lever on the camera in order to switch a clutch for transmitting a torque of the motor to the driving systems.

Japanese Patent Laid-Open No. 1-287547 has disclosed a drive control unit for a camera, wherein release, shutter charge, and zone change are performed with the rotation of a single motor, while film wind and film rewind are performed with the reversion of the motor.

Japanese Patent Laid-Open No. 3-81750 has disclosed a motor-driven camera, wherein film wind or shutter charge are achieved by rotating or reversing a single motor.

In some cameras, the driving systems for film wind and film rewind are driven using dedicated motors and a dedicated zoom motor.

Any of the foregoing devices requires a clutch for transmitting a torque of a motor to a selected one of the driven systems. A complex mechanism for allowing the clutch to perform switching is, therefore, needed. The complex mechanism contradicts a recent trend toward further downsizing of a camera, and leads to a cost increase due to an increase in the number of parts.

On the other hand, in a camera that is of the type driven by dedicated motors, the dedicated motors are allocated to operation mechanisms and always placed in a drive ready state. Drive can, therefore, be started swiftly. However, since multiple drive motors are required, a larger installation space is needed. This leads to a further cost increase.

OBJECTS AND SUMMARY OF THE INVENTION

The first object of the present invention is to provide a driving force transmission mechanism that enables switching of various driving systems and drive of a selected driving system using a single motor without a complex switching mechanism.

The second object of the present invention is to provide a driving force transmission mechanism for a camera that switches various driving systems and drives a selected driving system using a single motor without a complex switching mechanism, and offers an operational feeling of swiftness.

The first driving force transmission mechanism according to the present invention is a driving force transmission mechanism that transmits the driving force of a single motor selectively to multiple driven gears, comprising a sun gear rotated or reversed by the motor, a planetary gear engaging with the sun gear, multiple driven gears that are arranged on the revolution orbit of the planetary gear and to which the driving force of the motor is transmitted selectively, and a selection driving means that selects a driven gear with which the planetary gear engages with the rotation in one direction of the sun gear and transmits the driving force to the selected driven gear via the planetary gear with the rotation in the opposite direction.

The second driving force transmission mechanism of the present invention is a driving force transmission mechanism that transmits the driving force of a single motor selectively to multiple driven gears, comprising a sun gear rotated or reversed by the motor, a planetary gear engaging with the sun gear, a planetary gear revolving means that revolves the planetary gear with the rotation in one direction of the sun gear, a position detecting means that detects the position of the planetary gear revolving means, a rotation hindering means that hinders the rotation in the opposite direction of the planetary gear revolving means, multiple driven gears to which when the rotation of the planetary gear revolving means is prohibited by the rotation hindering means, the driving force of the motor is transmitted via the planetary gear, and a control means that moves the planetary gear to a position permitting engagement with a specific driven gear in accordance with the output or the position detecting means, and that when a driven gear different from the specific driven gear is selected, after driving the driven gear terminates, returns the planetary gear to an initial engagement position.

The above as well as other features and advantages of the present invention will be apparent from the description below.

BRIEF DESCRIPTION OF THE DRAWINGS

FIG. 3 is a development of a ratchet wheel with respect to the center of a click stop in the driving force transmission mechanism of FIG. 1;

FIG. 4 is a development of a ratchet wheel with respect to the center of the click stop in the driving force transmission mechanism of FIG. 1;

DETAILED DESCRIPTION OF THE PREFERRED EMBODIMENTS

Embodiments of the present invention will be described with reference to the drawings.

Figure 1:
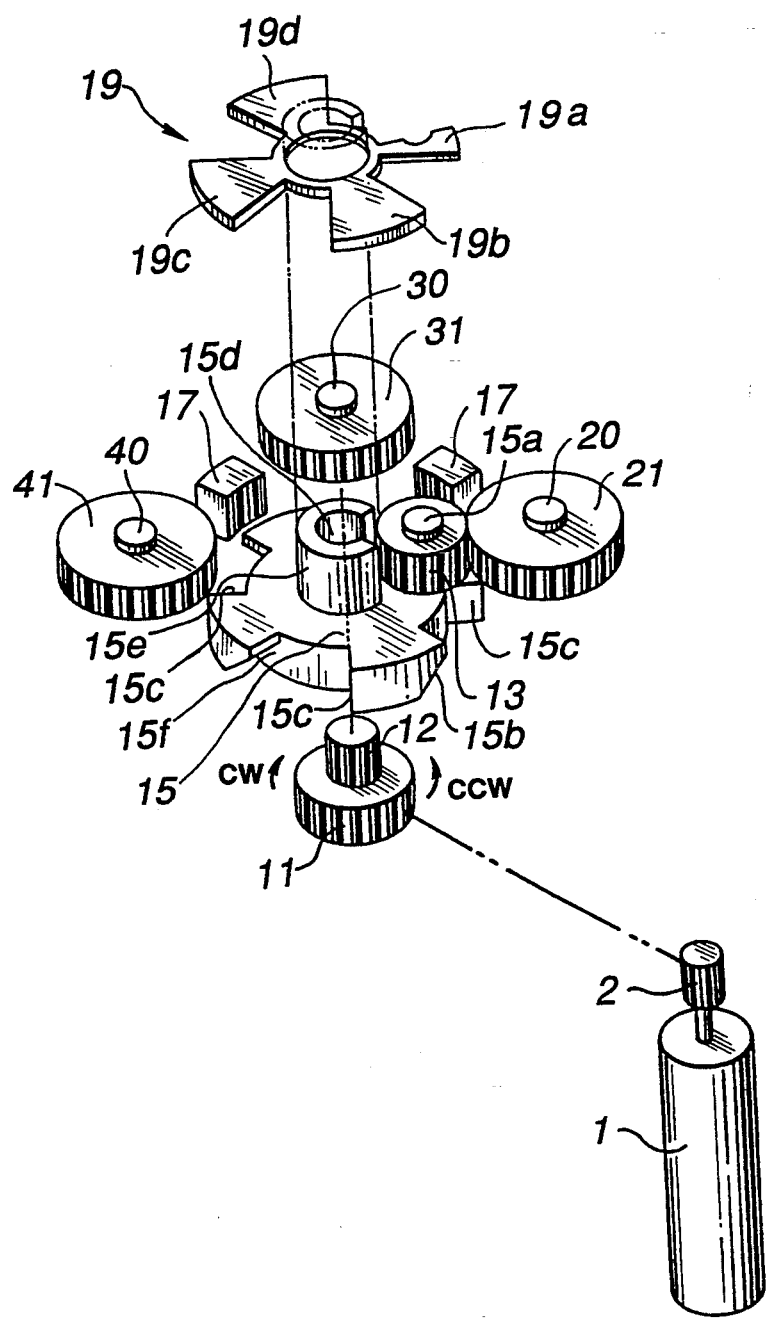
FIG. 1 is an enlarged oblique perspective view of a driving force transmission mechanism representing a first embodiment of the present invention.
Figure 2:
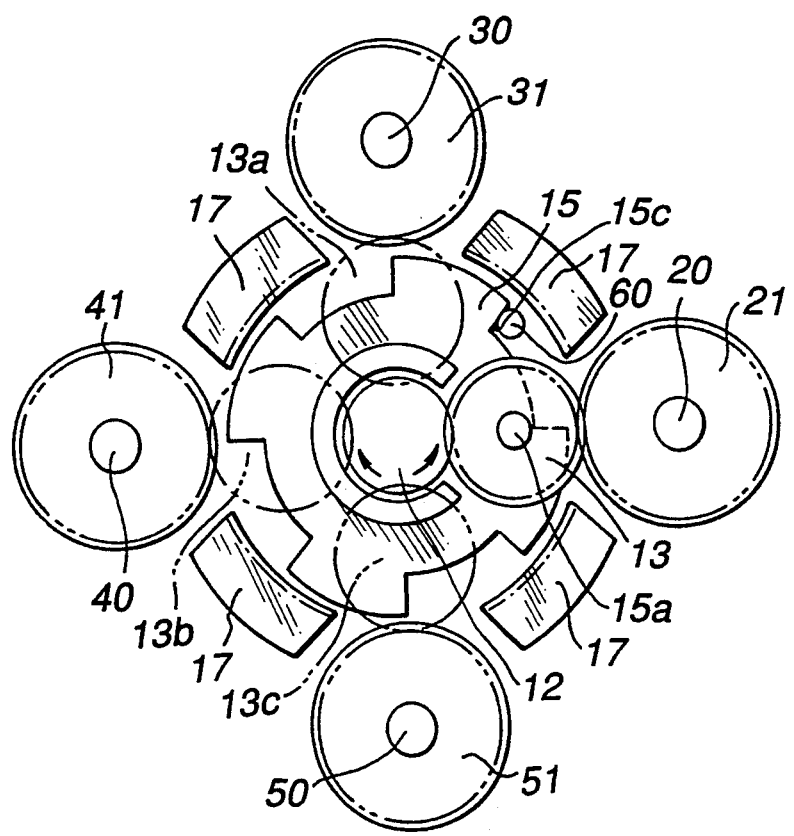
FIG. 2 is an enlarged plan view of a major portion of the driving force transmission mechanism of FIG. 1.

FIG. 1 is an enlarged oblique view of a driving force transmission mechanism representing the first embodiment the present invention. FIG. 2 is an enlarged plan view of a major portion of the driving force transmission mechanism representing the first embodiment, viewing the portion from above.

A single motor 1 in FIG. 1 has a pinion 2 which is mounted on the output axis thereof and can rotate in forward or reverse directions. The pinion 2 engages with a gear 11 via a reduction gear array (not shown) and transmits the torque of the motor 1 to the gear 11. A sun gear 12 sharing a spindle with the gear 11 is mounted on and united with the upper part of the gear 11.

A ratchet wheel 15 is shaped like a thick disk and has two symmetric pairs of notches 15f. One side wall of each of the notches 15f forms a vertical wall 15c, and the other wall thereof forms a cam surface 15b that is tapered downward.

The ratchet wheel 15 has a cylindrical section 15e in the center thereof. The cylindrical section 15e extends vertically upward from and is intergrally united with the ratchet wheel 15. An insertion hole 15d which is shaped exactly like the outer diameter of the cylindrical section 15e is bored on the top center of the ratchet wheel 15. The sun gear 12 is fitted into the insertion hole 15d in cylindrical section 15e so as to be freely rotatable. The cylindrical section 15e has a notch on part of the circumferential surface, so that the fitted sun gear 12 will engage with a planetary gear 13. The planetary gear 13 is fixed to a pin 15a, which extends vertically upward from an edge of the top of the ratchet wheel 15 and is opposed to the notch, so as to be freely rotatable about the pin 15a.

The planetary gear 13 causes slight friction (not shown) against the top of the ratchet wheel 15, and engages, as described above, with the sun gear 12. The ratchet wheel 15 rotates in the direction in which the sun gear 12 revolves around sun gear 12.

Axes 20 and 40, and axes 30 and 50 (not shown in FIG. 1) lie vertically so as to be separated by an equal distance horizontally from the sun gear and mutually opposed respectively. Driving system gears 21, 31, 41, and 51 that are driven gears are attached to the axes 20, 30, 40 and 50. These driving system gears are, as described later, coupled with driving systems and serving as driving sources for the driving systems.

A plurality of internal gears 17 are placed between each adjoining pair of the gears 21, 31, 41, and 51.

A click stop 60 projects vertically from below at a point on a rotative arc of the notches 15f of the ratchet wheel 15 (See FIG. 2). The ratchet wheel 15 and click stop 60 make up a one-way brake means that permits rotation of ratchet wheel 15 in one direction and prohibits its rotation in the opposite direction, which will be described later.

FIGS. 3 and 4 are circumferential developments of the ratchet wheel 15 with respect to the center of the click stop 60. FIG. 3 shows the relationship between the ratchet wheel 15 and click stop 60 established when the planetary gear 13 engages with the driving system gear 21 as shown in FIG. 2. FIG. 4 shows the relationship between the ratchet wheel 15 and click stop 60 established when the planetary gear 13 is located between, for example, the driving system gears 21 and 31.

The click stop 60 is held by a guide holder 61 so that the click stop 60 can freely slide up and down, and is normally pressed upwardly by a spring 63 placed between a base 62 and the bottom of the click stop 60. When the ratchet wheel 15 rotates and the click stop 60 reaches the notch 15f, the click stop 60 is pressed upwardly by the spring 63.

When the sun gear 12 rotates in the CW direction in FIG. 1, the planetary gear 13 revolves clockwise. This causes the ratchet wheel 15 to rotate clockwise; that is, in an arrow-M1 direction in FIG. 3. The click stop 60 abuts the vertical wall 15c soon, which restricts the rotation in the M1 direction of the ratchet wheel 15. If the restrictive position is set to a position permitting engagement with any of the driving system gears 21, 31, 41, and 51, the torque of the sun gear 12 can be transmitted to the one of the driving system gears 21, 31, 41, and 51 via the planetary gear 13.

When the sun gear 12 rotates in the CCW direction in FIG. 1, the planetary gear 13 revolves counterclockwise. This causes the ratchet wheel 15 to rotate counterclockwise; that is, in an arrow-M2 direction in FIG. 3. At this time, the click stop 60 moves along the cam surface 15b in contact with the bottom of the ratchet wheel 15 (state shown in FIG. 4) and reaches the next notch 15f. At this time, the planetary gear 13, which has been in a state of engaging with the driving gear 21 shown in FIG. 2, revolves counterclockwise, engages with the internal gear 17, and reaches a position resulting from a little counterclockwise revolution at a position indicated with an alternate long and two short dashes line in FIG. 2. As described above, when the sun gear 12 rotates In the CW direction in FIG. 2, the planetary gear 13 returns to the position 13a in FIG. 2, firmly engages the driving gear 31, and then transmits the torque of the sun gear 12 to the driving gear 31. The sun gear 12 may be rotated in the CCW direction so that the planetary gear 13 will be positioned at a position 13b or 13c.

The revolving position of the planetary gear 13 is identified when a photo-reflector (PR) which is not shown detects a reflector 19 that rotates as part of and together with the ratchet wheel 15.

The reflector 19 is shaped like a disk having four pie shaped leaves 19a, 19b, 19c, and 19d, which extend outwardly alternately with two pairs of symmetric notches among them, and a circular hollow opening. The circular hollow opening engages the upper part of the cylindrical section 15e lying vertically in the top center of the ratchet wheel 15. The leaf 19a of the four leaves 19a, 19b, 19c, and 19d is narrowed to be one-third the width of any of the other three leaves measured in the circumferential direction.

When the reflector 19 rotates, being interlocked with the ratchet wheel 15, the photo-reflector arranged at a specified position detects the positions of the leaves 19a, 19b, 19c, and 19d using a short signal sent from the leaf 19a as a reference. The planetary gear 13 is then revolved to a position permitting engagement with any intended one of the driving system gears 21, 31, 41, and 51.

The driving system gears 21, 31, 41, and 51 are coupled with gear arrays (not shown) connecting to driving systems for frame zoom down, frame zoom up, film wind, and film rewind. When any of the driving system gears rotates, the associated one of the driving systems operates.

The operation will be summarized.

1) The motor 1 causes the sun gear 12 to rotate in the CCW direction in FIG. 1, whereby the planetary gear 13 shifts to a position permitting engagement with a driving system gear coupled with an intended driving system out of the driven gears. The position is detected by the photo-reflector. - - - Driving system selection 2) The motor 1 causes the sun gear 12 to rotate in the CW direction in FIG. 1, whereby the planetary gear 13 rotates. A driving force is then transmitted to a driving system gear coupled with an intended driving system via the planetary gear 13. - - - Transmission of a driving force to a driving system FIG. 5 is an electric circuit diagram showing an electric configuration of the first embodiment.

Figure 5:
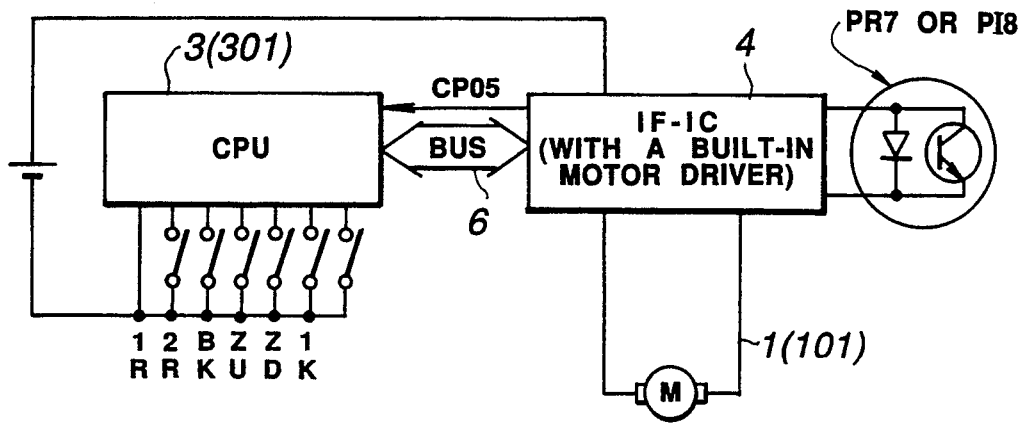
FIG. 5 is an electrical circuit diagram showing an electric configuration of the driving force transmission mechanism of FIG. 1.

In FIG. 5, 1R, 2R, BK, ZU, ZD, and 1K connected to a CPU 3 represent the following switches:

1R: first-release switch or photometry/range-finding timing switch

2R: second-release switch or exposure switch

BK: back-cover open/close detecting switch

ZU: zoom-up switch

ZD: zoom-down switch

1K: film feed value detecting switch Based on the signals sent from these switches, the CPU 3 controls an interface IC (IF-IC) 4 with a built-in motor driver over a bus 6, drives the motor (M) 1, switches the engaging states of the planetary gear that is a component of the driving force transmission mechanism, and drives a driven gear.

The interface IC 4 is connected to a photo-reflector (PR) 7 for detecting the position of the planetary gear 13 or a photo-sensor such as a photo-interrupter P18. Thereby, an output signal of the photo-sensor is fetched and output as the position information of the planetary gear to the CPU 3 over a signal line CPO5.

The CPU 3 can set up the interface IC 4 over the bus 6. Specifically, the CPU 3 can control energizing or deenergizing of the motor 1, and specify a drive voltage. Furthermore, the CPU 3 can control the current value of an LED of, for example, the photo-reflector PR7 and the threshold of light current flowing through a phototransistor thereof. Circuits relating to auto-focusing (AF) and automatic exposure (AE) are incorporated In the interface IC 4.

Figure 6:
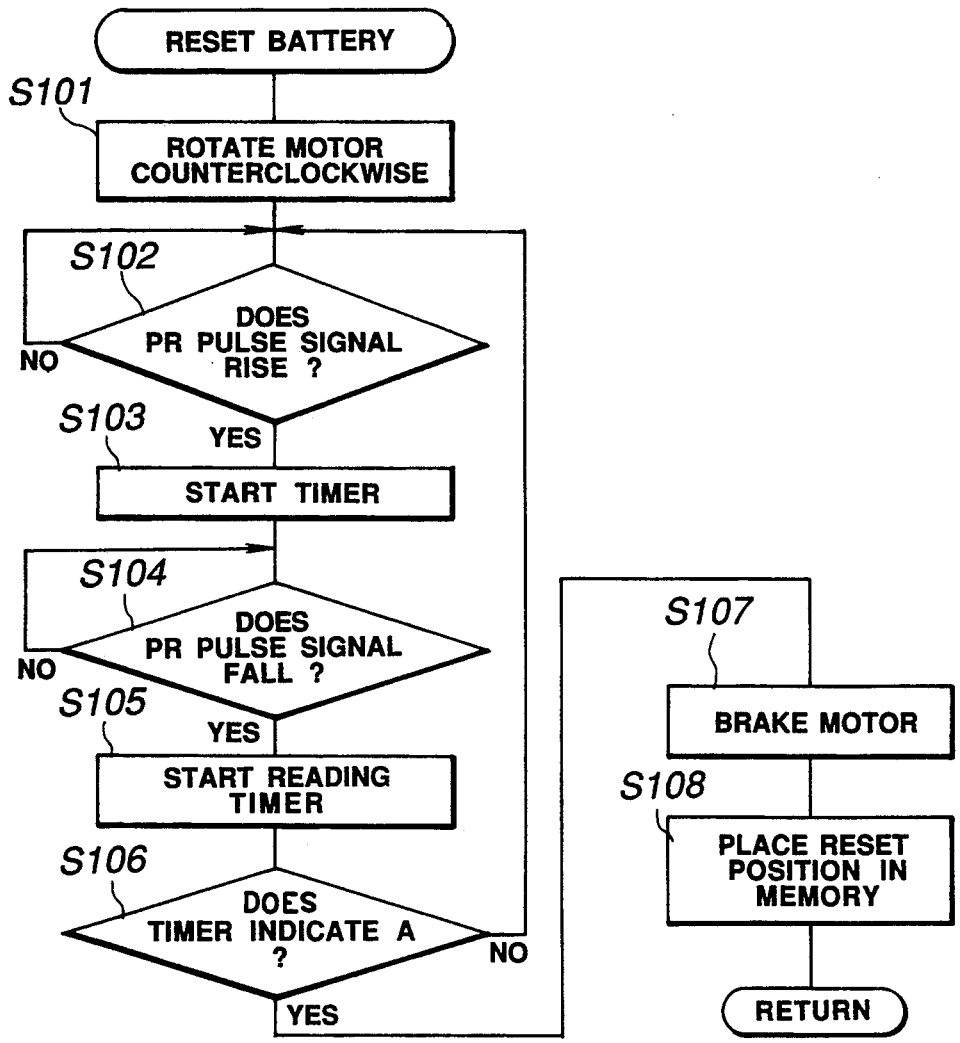
FIG. 6 is a flowchart showing an initial position control operation for a planetary gear in the driving force transmission mechanism of FIG. 1.

Next, the initial position control operation of the planetary gear 13 will be described with reference to the flowchart of FIG. 6.

First, a battery is reset. The motor 1 is then rotated, which causes the sun gear 12 to rotate the CCW direction in FIG. 1 (step S101). Next, a rise is detected in the pulse signal of the photo-reflector 7 (step S102), and then a timer in the CPU is started (step S103). Thereafter, a fall is detected In the pulse signal of the photo-reflector PR7 (step S104), and then reading the timer is started (step S105). When the timer reading indicates a specified time A (step S106), the motor 1 is braked (step S107). The reset position is placed in memory (step S108). Finally, control returns to the main routine.

Figure 7:
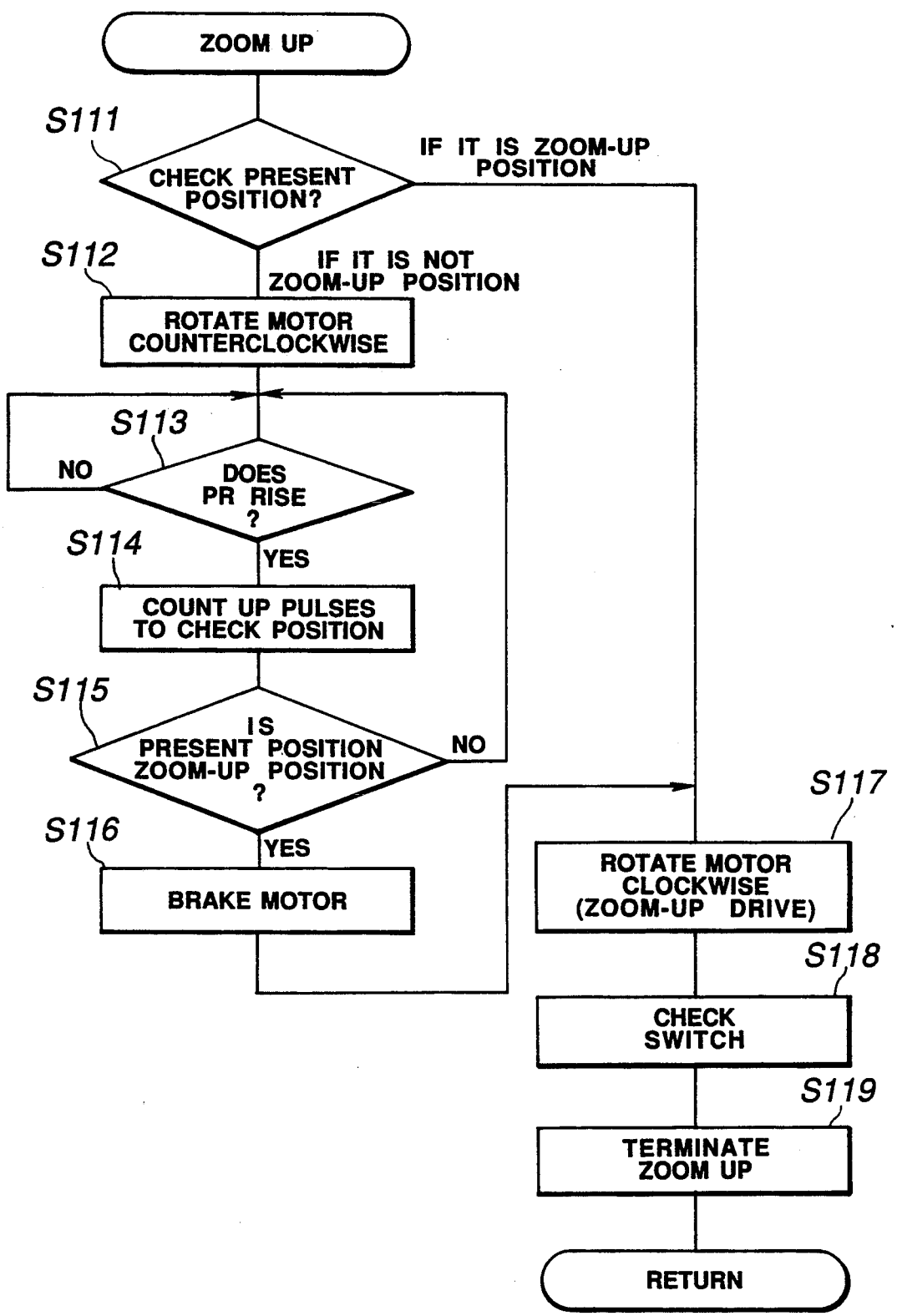
FIG. 7 is a flowchart showing a zoom up operation among the operations of driving systems in the driving force transmission mechanism of FIG. 1.

Next, the zoom-up operation performed by one of the driving systems will be described with reference to the flowchart of FIG. 7.

First, it is determined whether the current position of the planetary gear 13 is a position 13a (See FIG. 2) permitting engagement with the zoom-up driving system gear 31 (step S111). If the current position is not the position 13a, the motor 1 is rotated in order to rotate the sun gear 12 in the CCW direction in FIG. 2 (step S112). When a rise is detected in the pulse signal of the photo-reflector PR7 (step S113), position count-up is started (step S114). Thereafter, when the planetary gear 13 reaches the position 13a permitting engagement with the zoom-up driving system gear 31 (step S115), the motor 1 is braked (step S116). Control then passes to a step S117.

When the planetary gear 13 firmly engages the zoom-up driving system gear 31, motor 1 is rotated in the CW direction in FIG. 1 so that the sun gear 12 will rotate clockwise. The zoom-up driving system gear 31 is then driven via the planetary gear 13 (step S117). Thereafter, the zoom-up switch ZU is checked (step S118). When the lens reaches an intended zoom position, the motor 1 is stopped to terminate the zoom-up operation (step S119). Control then returns to the main routine.

In the first embodiment, the driving systems are designed for film wind, film rewind, frame zoom up, and zoom down. The applications of the driving systems are not limited to the above operations, but are also suitable for shutter drive, barrier open/close, auto-focus lens extension and withdrawal, strobe movement, and picture switching for panoramic photography.

Next, a driving force transmission mechanism of the second embodiment of the present invention will be described.

Figure 8:
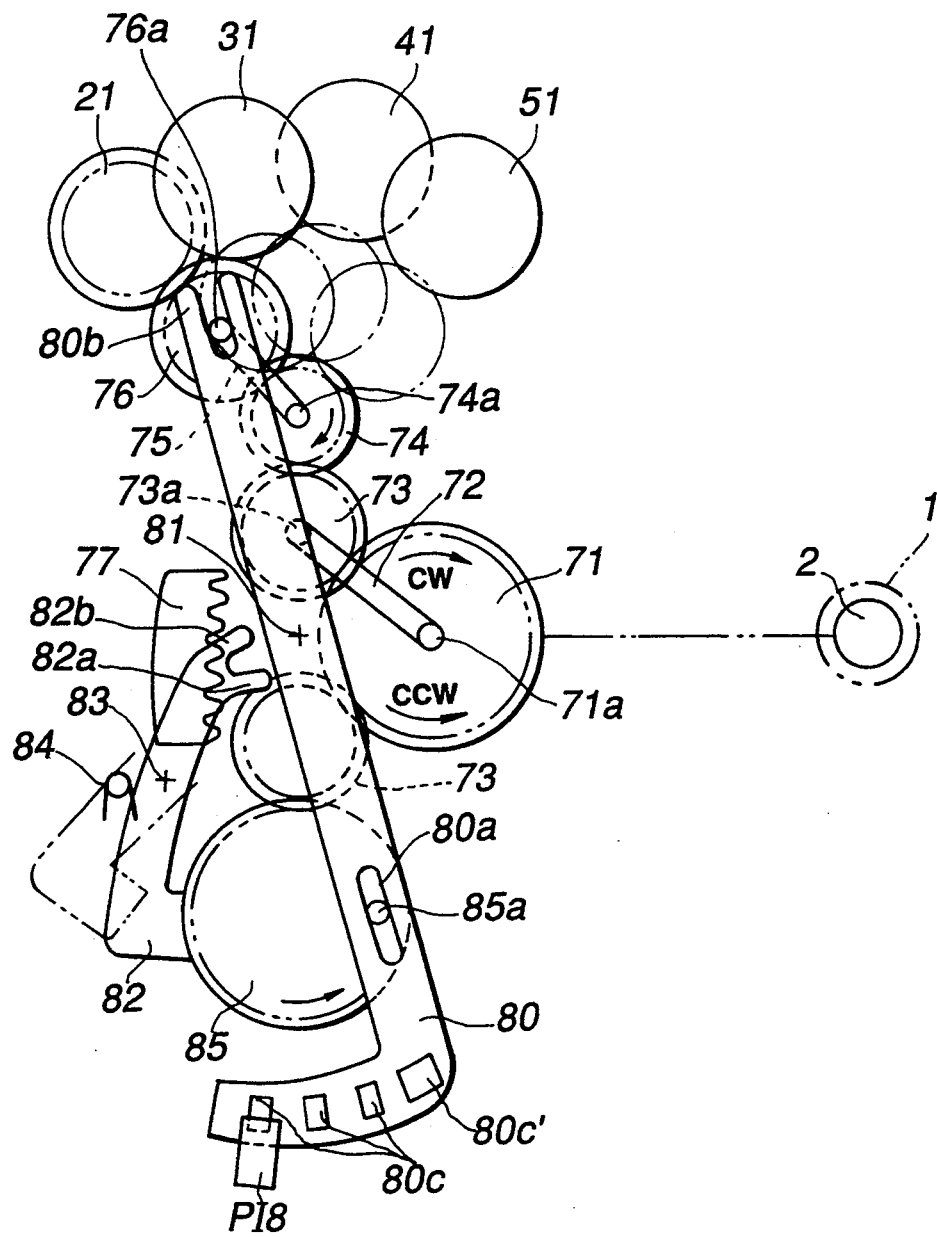
FIG. 8 is a plan view of a driving force transmission mechanism representing a second embodiment of the present invention.

FIG. 8 is a plan view of a driving force transmission mechanism representing the second embodiment.

In FIG. 8, a pinion 2 is an output pinion for a single motor 1 capable of rotating forward and reversing. The pinion 2 engages with a reduction gear array (not shown) to transmit the torque of the motor 1 to a sun gear 71.

A planetary gear 73 engages the sun gear 71 and is coupled with the sun gear 71 via a gear arm 72. When the sun gear 71 rotates in the CCW direction in FIG. 8, the planetary gear 73 revolves counterclockwise with a center axis 71a of the sun gear 71 as a center, and further revolves while engaging with an internal gear 77.

While the planetary gear 73 is revolving, a spindle 73a of the planetary gear 73 pushes an end 82a at a forked distal end of a stopper 82 that swivels about an axis 83 as a rotation center. This causes a toggle spring 84 attached to the stopper 82 to change the orientation of the spring force, whereby the stopper 82 is pushed up to a position indicated with an alternate long and two short dashes line with the supporting point 83 as a center. This causes the planetary gear 73 to engage a gear 85. The planetary gear 73 then transmits the torque of the motor 1 to the gear 5. A pin 85a rests vertically on the gear 85, and is fitted into an elongated hole 80a bored on an arm 80 whose rotation center lies at an axis 81.

The proximal portion of the arm 80 is an L-shaped bend. The bend has multiple holes 80c and 80c' arranged in a row. The width of the hole 80c' is about twice as large as those of the other three holes 80c. A photo-interrupter PI8 is located at a position at which the photo-interrupter PI8 will face any of the holes 80c with a transport path between them. The distal end of the arm 80 is a forked section 80b, with which a spindle 76a supporting a planetary gear 76 is engaged. Furthermore, the spindle 76a is supported by the distal end of a gear arm 75 that is supported by a fixing axis 74a, which will be described later, so as to be freely rotatable.

When the sun gear 71 rotates counterclockwise and the gear 85 rotates counterclockwise, the pin 85a causes the arm 80 to swivel with an axis 81 as a rotation center. Thereby, the planetary gear 76 can be arranged at a position permitting engagement with any of driving system gears 21, 31, 41, and 51 that are driven gears.

Using the hole 80c' as a reference position, the photo-interrupter PI8 detects the position of the arm by identifying any of the holes 80c. When the arm 80 shifts to a position enabling the planetary gear 76 to engage with an intended driving system gear, the motor 1 is reversed in order to rotate the sun gear 71 clockwise. When the sun gear 71 rotates clockwise, the planetary gear 73 starts revolving clockwise with the axis 71a as a center, and further revolves while engaging with the internal gear 77.

While the planetary gear 73 is revolving, the spindle 73a of the planetary gear 73 advances and pushes ahead a distal end 82b of the stopper 82. This changes the orientation of the force of the toggle spring 84. The stopper 82 then shifts to a solid line position indicated in FIG. 8. This causes the proximal surface of the stopper 82 to abut the circumferential surface of the gear 85. Consequently, the rotation of the gear 85 is stopped. When the sun gear 71 rotates clockwise, the planetary gear 73 parts from the internal gear 77 and engages with a gear 74.

The gear 74 is secured with the fixing axis 74a. Since the gear 74 and planetary gear 76 are coupled with each other via the gear arm 75, the torque of the sun gear 71 is transmitted to any selected one of the driving system gears 21, 31, 41, and 51 that are driven gears via the planetary gear 73, gear 74, and planetary gear 76.

The above operation will be summarized below.

1) The motor 1 causes the sun gear 71 to rotate counterclockwise, so that the planetary gear 76 shifts to a position permitting engagement with a driving system gear coupled with an intended driving system out of the driven gears. The position is detected by the photo-interrupter or the like. - - - Driving system selection 2) The motor 1 causes the sun gear 71 to rotate clockwise, whereby the planetary gear 76 rotates. A driving force is then transmitted to a driving system gear coupled with an intended driving system out of the driven gears via the planetary gear 76. - - - Transmission of a driving force to a driving system Next, a driving force transmission mechanism of the third embodiment of the present invention will be described.

Electric circuits for controlling the driving force transmission mechanism of this embodiment have substantially the same circuitry as those of the first embodiment shown in FIG. 5. A CPU in this embodiment is shown as the CPU 301 in FIG. 5, and a single motor serving as a driving source in this embodiment is shown as the motor (M) 1 in FIG. 5.

Figure 9:
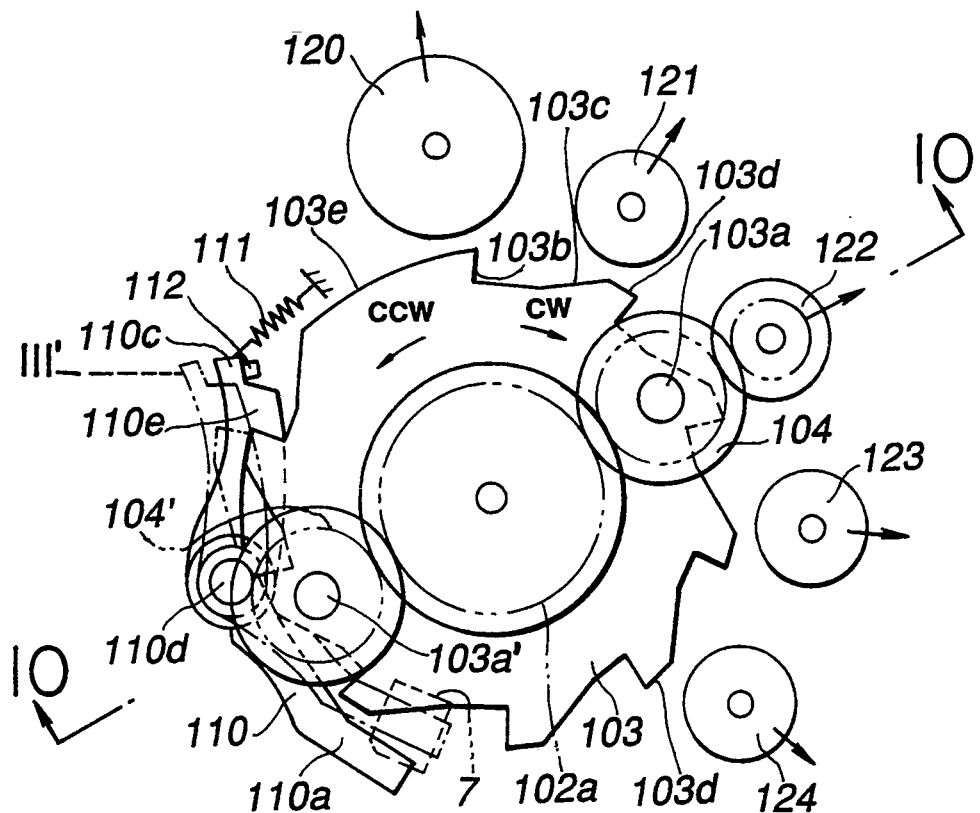
FIG. 9 is a plan view of a driving force transmission mechanism representing a third embodiment of the present invention.
Figure 10:
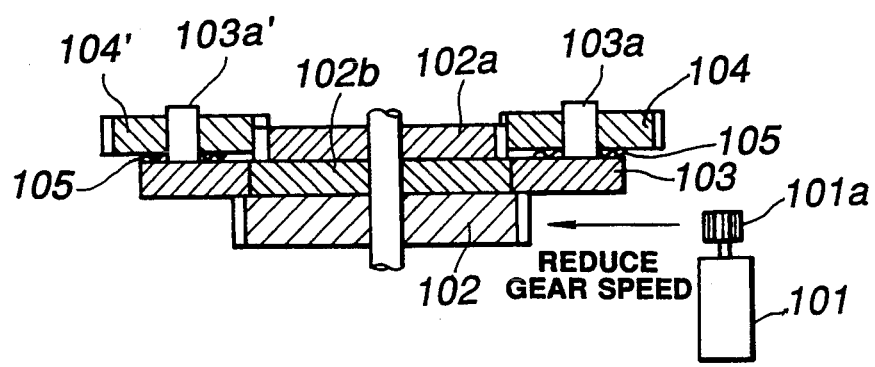
FIG. 10 is a cross sectional view of a major portion of a driving force transmission mechanism, showing a 10—10 cross section of FIG. 9.

FIG. 9 is a plan view of the driving force transmission mechanism representing the third embodiment. FIG. 10 is a cross-sectional view or a major portion of the driving force transmission mechanism, showing an A—A cross section of FIG. 9.

As shown in FIG. 10, a pinion gear 101a is attached to an output axis of the single motor 101 capable of rotating forward and reversing. The pinion 101a transmits the torque of the motor 101 to a gear 102 via a reduction gear array which is not shown. A disk-like spacer 102b for determining the rotation center of a ratchet wheel 103, which will be described later, is united with the gear 102. A gear 102a is placed on the top of the spacer 102b in such a manner that the gear 102a is coaxial with and rotatable as part of the gear 102. Spindle pins 103a and 103a' lie vertically at the symmetrically-located margins of the top of the ratchet wheel 103. Planetary gears 104 and 104' are attached to the spindle pins 103a and 103a' so as to engage gear 102a. The planetary gears 104 and 104' cause slight friction 105 against the ratchet wheel 103.

When the gear 102 rotates, the gear 102a formed as part of the gear 102 rotates the same direction. This causes the planetary gear 104 engaging gear 102a to rotate. Therefore, the ratchet wheel 103 produces torque in the direction in which the gear 102a rotates.

The ratchet wheel 103 and a non-return lever 110 which will be described later, make up a one-way clutch means. To be more specific, the ratchet wheel 103 has eight similar claws each having a circumferential surface 103d and one claw having a circumferential surface 103e which is longer than the circumferential surface 103d. The non-return lever 110 for controlling the rotation of the ratchet wheel 103 is arranged near the outer circumference of one side of the ratchet wheel 103. The non-return lever 110 has its supporting point fixed to a spindle 110d so as to be freely pivotable. A non-return claw 110e is formed at one arm end so as to sequentially engage the above claws. A spring 111 is stretched between the one arm end of the non-return lever 110 and a specified stationary position in a camera body. The spring 111 presses (IE urges) one end of the non-return lever toward the ratchet wheel 103. The one arm end 110c pivots to reach a position at which the one arm end 110c abuts on a stopper 112 due to a pressing force of the spring 111, and engages with a locking surface 103b of a claw of the ratchet wheel 103.

In the vicinity of and along the circumference of one side of the ratchet wheel 103, driving system gears 120, 121, 122, 123, and 124 that are driven gears and serve as driving sources for driving systems which will be described later are secured with axes which are not shown and arranged with specified spacings, which correspond to those spacings among the claws of the ratchet wheel 103. The planetary gears 104 and 104' revolve along with the rotation of the gear 102a. When the non-return claw 110e engages with a specified locking surface 103b of a claw of the ratchet wheel 103, the planetary gear 104 or 104' engages with one of the driving system gears 120, 121, 122, 123, and 124. The driving system gear 120 is coupled with a driving system for a film wind mechanism via a gear array which is not shown and serves as a driving source for the film wind mechanism. The driving system gear 121 is coupled with a driving system for a film rewind mechanism via a gear array which is not shown and serves as a driving source for the film rewind mechanism. The driving system gear 122 is coupled with a driving system for an auto-focusing mechanism via a gear array which is not shown and serves as a driving source for the auto focusing mechanism. The driving system gear 123 is coupled with a driving system for a zoom-down mechanism via a gear array which is not shown and serves as a driving source for the mechanism. The driving system gear 124 is coupled with a driving system for a zoom-up mechanism via a gear array which is not shown and serves as a driving source for the zoom-up mechanism.

When the gear 102a rotates in an arrow-CCW direction in FIG. 9, the ratchet wheel 103 also rotates counterclockwise with the revolution of the planetary gears 104 and 104'. If the frictional force of the friction 105 members is set to a value larger than the pressing force of the spring 111, the non-return lever 110 is pushed outwardly by the inclined surface 103c of a claw of the ratchet wheel 103 against the pressing force of the spring 111 and pivots to a position 111 indicated with an alternate long and two short dashes line in FIG. 9. The ratchet wheel 103 is then rotated by the ratcheting mechanism.

The control mechanism (described later) based on the pivoting of the non-return lever 110 controls the rotation of the ratchet wheel 103, which enables the control of the position of the planetary gear 104 or 104' on its revolution orbit. Specifically, the planetary gear 104 or 104' can be stopped at an intended position, and the revolution of the planetary gear 104 or 104' can be controlled so as to engage with any of the driving system gears 120, 121, 122, 123, and 124.

When either the planetary gear 104 or 104' engages one of the driving system gears 120, 121, 122, 123, and 124, a driving system is selected. Thereafter, when the gear 102a is rotated in an arrow-CW direction in FIG. 9, the ratchet wheel 103 produces torque for rotating in the same CW direction. Since the non-return claw 110e is engages the locking surface 103b of a claw of the ratchet wheel 103, rotation of the ratchet wheel 103 remains restricted and stationary. Then, the torque of the gear 102a is transmitted to a selected one of the driving system gears 120, 121, 122, 123, and 124 via the planetary gear 104 or 104'.

Next, the control mechanism based on the pivoting of the non-return lever 110 will be described.

The other arm end of the non-return lever 110 is covered with a reflector 110a, and a photo-reflector 7 is arranged at a specified position in the thrust direction on the pivoting orbit of the other arm end. When the non-return lever 110 pivots to position 111 indicated with an alternate long and two short dashes line in FIG. 9, the photo-reflector 7 detects the other arm end.

Figure 11:
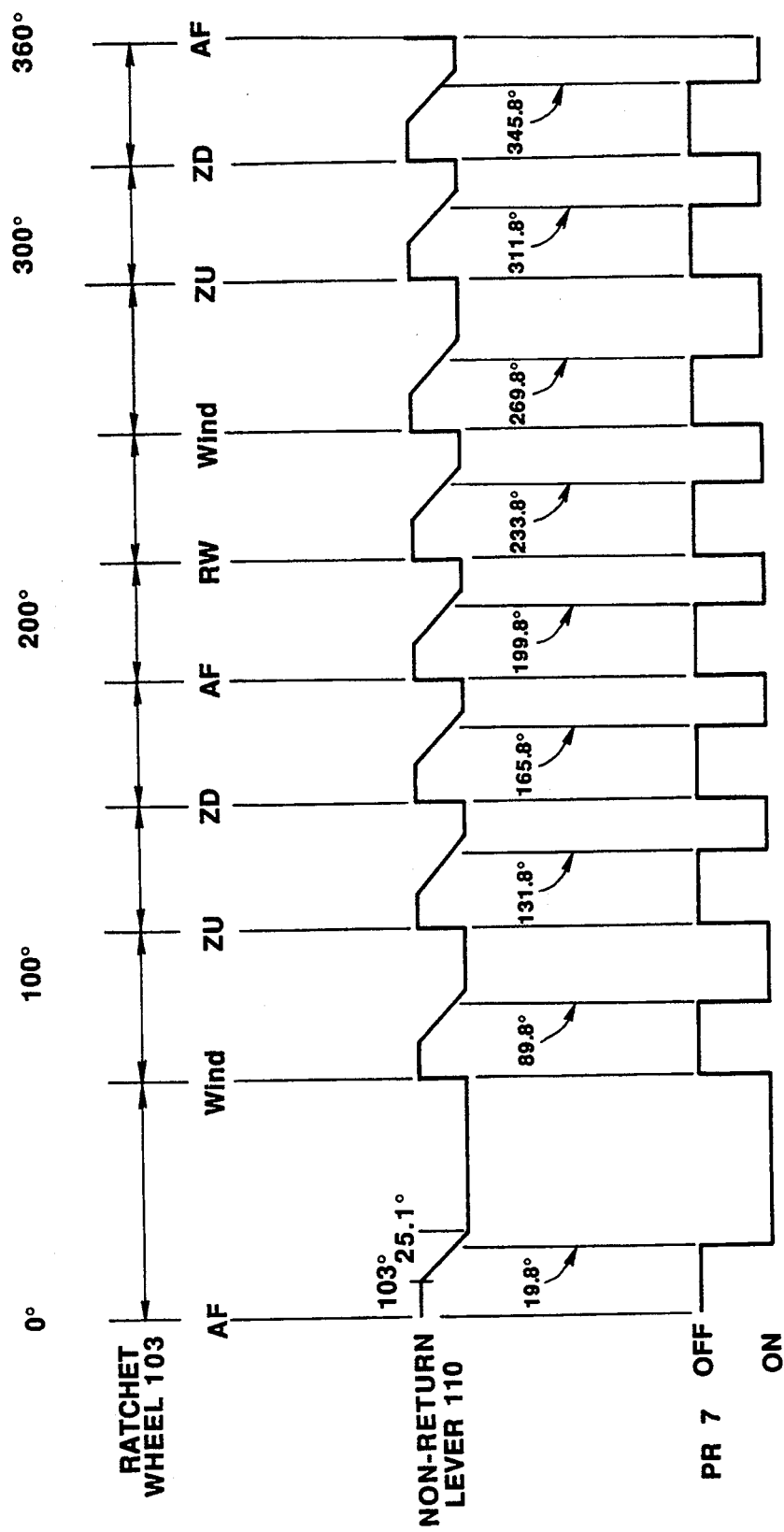
FIG. 11 is a timing chart showing the operations of a ratchet wheel and a non-return lever, and an output signal of a photo-reflector in the driving force transmission mechanism of FIG. 9.

FIG. 11 is a timing chart showing the operations of the ratchet wheel 103 and non-return lever 110, and an output signal of the photo-reflector 7.

The following alphabetic in FIG. 11 indicate the states of the ratchet wheel 103:

Wind: film wind
RW: film rewind
AF: auto-focusing
ZD: zoom down
ZU: zoom up The states are associated with the driving system gears 120, 121, 122, 123, and 124. Specifically, when the ratchet wheel 103 rotates, either the planetary gear 104 or 104' engages one of the driving system gears 120, 121, 122, 123, and 124 that are driven gears. Consequently, one of the above states is selected.

As described above, one of nine claws of the ratchet wheel 103 has a longer circumferential surface than the other claws. When the ratchet wheel 103 is rotated in the CCW direction in FIG. 9, the photo-reflector 7 outputs eight short on signals (pulse signals) and one long on signal (pulse signal).

In the third embodiment, an initial position is a position agreeing with the fall of the eighth on signal the photo-reflector 7 outputs after a long on signal falls; that is, a state in which the planetary gear 104 engages with the driving system gear 122 coupled with the auto-focus lens driving mechanism.

Figure 12:
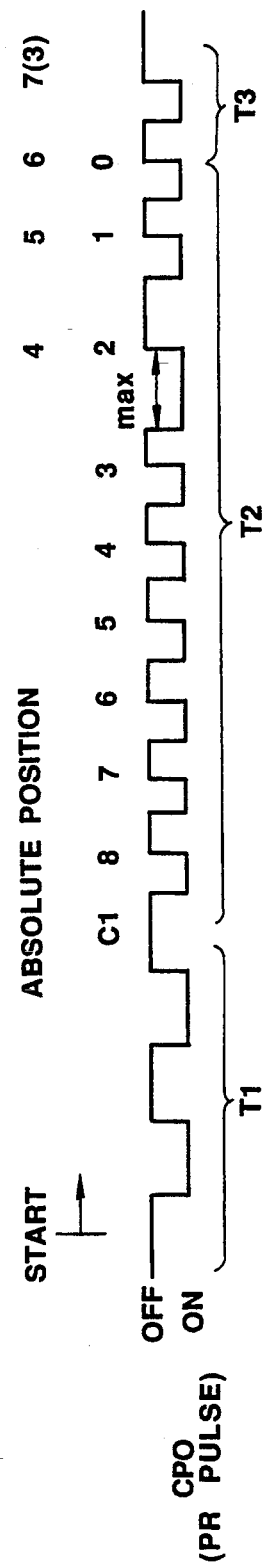
FIG. 12 is a timing chart showing an output signal of a photo-reflector concerning the initial alignment of a ratchet wheel and a planetary gear in the driving force transmission mechanism of FIG. 9.

FIG. 12 is a timing chart of an output signal of the photo-reflector 7 relating to the initial alignment of the ratchet wheel 103 in the third embodiment.

A pulse signal (CPO in FIG. 12) the photo-reflector 7 outputs is skipped for a period T1 immediately after activation (start) in FIG. 12. The number of pulses is based on data GPSTRT existent in an EEPROM which is not shown. Next, the pulses of the pulse signal are counted for a period T2 by a pulse counter C1, which is used as a drive sequence signal for one cycle. During the on signal interval indicated with "max" in FIG. 12, a long on signal is output. The pulse signal output for a period T3 causes the ratchet wheel 103 to move to a position associated with the driving system gear 122 for auto-focusing drive; that is, a position at which the planetary gear 104 engages with the driving system gear 122.

Figure 13:
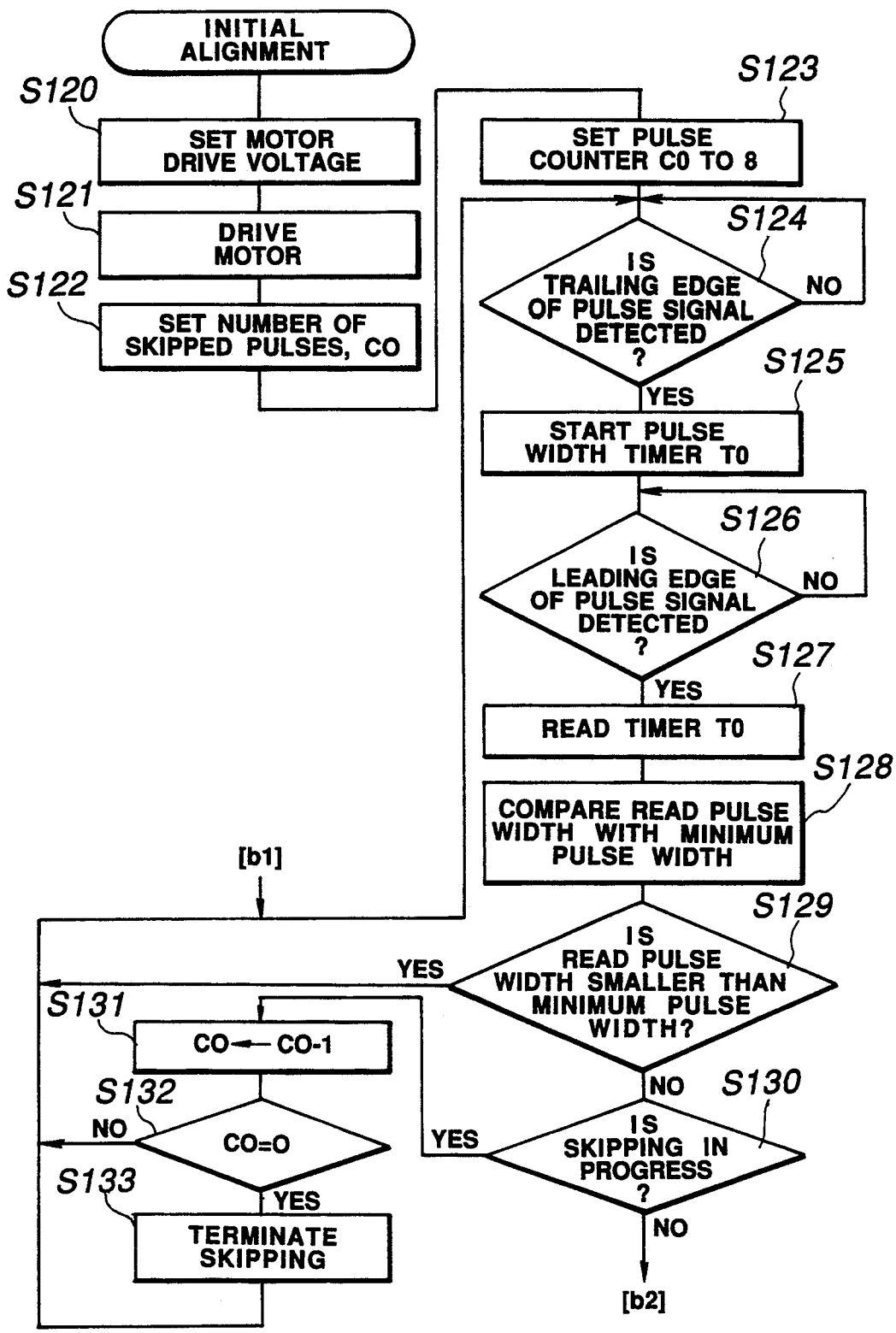
FIG. 13 is a flowchart showing an initial alignment subroutine for a ratchet wheel and a planetary gear in the driving force transmission mechanism of FIG. 9.
Figure 14:
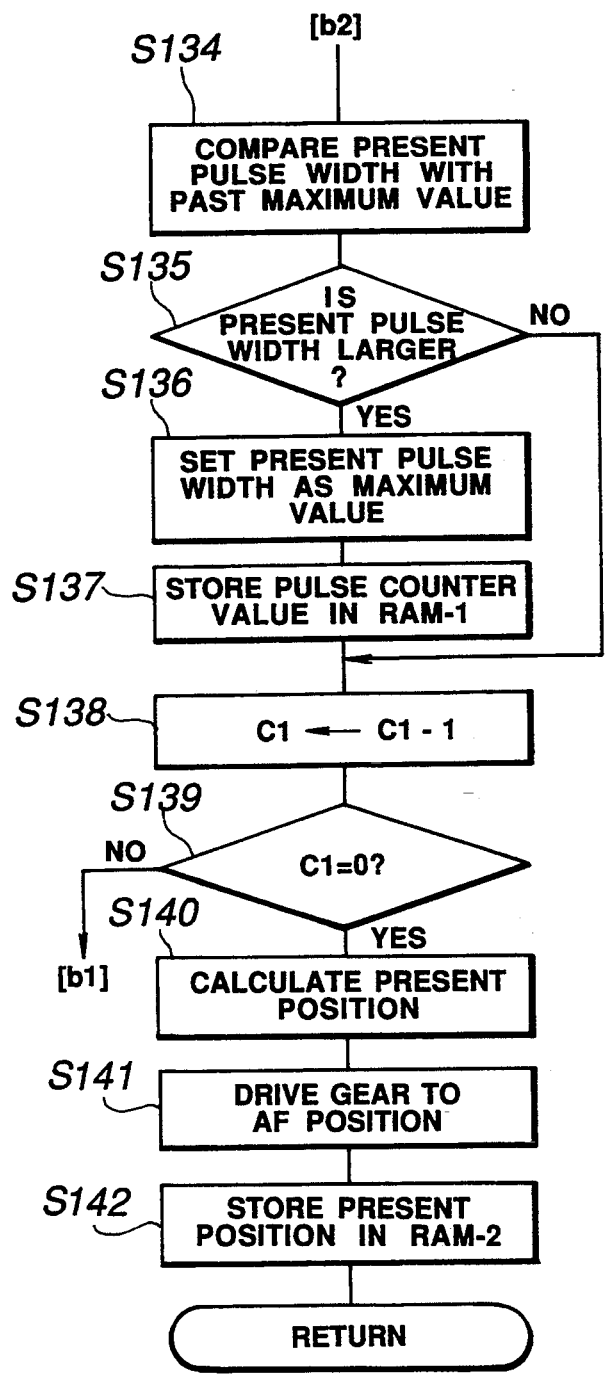
FIG. 14 is a flowchart showing an initial alignment subroutine for a ratchet wheel and a planetary gear in the driving force transmission mechanism of FIG. 9.

FIGS. 13 and 14 are flowcharts showing a subroutine Initial Alignment of the ratchet wheel 103 (planetary gear 104 or 104') in the third embodiment. The flowcharts will be described as the operation of the CPU 301 in FIG. 5. In the initial alignment of the ratchet wheel 103, or eventually, the planetary gear 104 or 104', first, a motor drive voltage is set (step S120), and then the motor 101 (See FIG. 10) is driven (step S121). Then, the number of skipped pulses, C0, is set to a value stored in an EEPROM which is not shown (step S122). At this time, a flag F1 is set to 1. Thereafter, the pulse counter C1 is set to 8 (step S123). A standby state remains intact until the fall (trailing edge) of the pulse signal is detected (step S124). When the fall of the pulse signal is detected, a pulse width timer T0 starts counting (step S125). A hardware timer, which is not shown, of the CPU is energized until the rise (leading edge) of the pulse signal is detected (step S126). In short, a pulse width is detected.

When the rise of the pulse signal is detected at the step S126, the value of the timer T0 is read; that is, the pulse width of a pulse output by the photo-reflector 7 is measured (step S127). The read value is then compared with the data of a minimum pulse width existent in the EEPROM (steps S128 and S129). When the pulse width of a pulse output by the photo-reflector 7 is lower than the minimum pulse width existent in the EEPROM, it is determined that a chattering occurs. Control then returns to the step S124.

If it is found at the steps S128 and S129 that the pulse width of a pulse output by the photo-reflector 7 is larger than the minimum pulse width existent in the EEPROM, the flag F1 is checked to see if skip is in progress (step S130). If skip is in progress, the number of skipped pulses, C0, is decremented (step S131). It is checked if C0 equals to zero (step S132). If it is found at the step S132 that C0 does not equal to zero, control returns directly to the step S124. If C0 is equal to zero, skip termination is performed (step S133) and then control returns to the step S124. In the skip termination, the flag F1 is reset to 0.

When it is determined at the step S130 that skip terminates, control shifts to [b2] in FIG. 14. The current pulse width of a pulse output by the photo-reflector 7 is compared with a past maximum value (steps S134 and S135). If the current pulse width is larger, the current pulse width is set as a maximum value (step S136). The value of the pulse counter C1 is stored in a RAM-1 area in a RAM which is not shown (step S137). Thereafter, the pulse counter C1 is decremented (step S138).

If it is determined at the step S135 that the current pulse width is smaller than the past maximum value, control shifts to the step S138. Thereafter, it is determined whether the pulse counter C1 indicates 0 (step S139). If it is found at the step S139 that the pulse counter C1 does not indicate 0; that is, If the one-cycle sequence shown in FIG. 12 has not terminated, control shifts to [b1] in FIG. 13 and then returns to the step S124.

If it is determined at the step S139 that the pulse counter C1 indicates 0; that is, if the one-cycle sequence shown in FIG. 12 has terminated, the current position of the ratchet wheel 103 will be calculated (step S140). In other words, the absolute position data of the current position represented as C1=0 is calculated using the data in RAM-1 in which the position data represented as a maximum pulse width "max" is stored.

When the absolute position data that indicates an angular position of the ratchet wheel 103 is 4, the angular position is a position at which the maximum pulse width "max" is detected (See the timing chart of FIG. 12). When the ratchet wheel 103 is rotated counterclockwise, every time a pulse is output, the data value is incremented. The resultant data value is represented as the absolute position data. If a value obtained by adding 4 to the data value stored in the RAM-1 area exceeds 10, only the low-order (CIE units) character is adopted and incremented by 1. The resultant value is regarded as absolute position data. The absolute position data ranges from 1 to 9 of data values. Referring to FIGS. 9 and 11, more specific description will be given. For example, if the absolute position data is 4, the angular position of the ratchet wheel 103 corresponds to a state in which engagement with the driving system gear For film wind drive 120 is selected. When the absolute position data is 3 or 7, the angular position of the ratchet wheel 103 corresponds to a state in which engagement with the driving system gear for auto-focus drive 122 is selected.

Thereafter, the planetary gear 104 is driven to a position permitting engagement with the driving system gear for auto-focusing drive 122 (step S141). The current position data of the ratchet wheel 103, or the planetary gear 104 or 104' supported by the ratchet wheel 103 is stored in a RAM-2 area in the RAM (step S142). The subroutine then terminates. The position data stored in the RAM-2 area is, in this case, 7 or 3 indicating a position permitting engagement with the driving system gear 122 (See the timing chart of FIG. 12).

Figure 15:
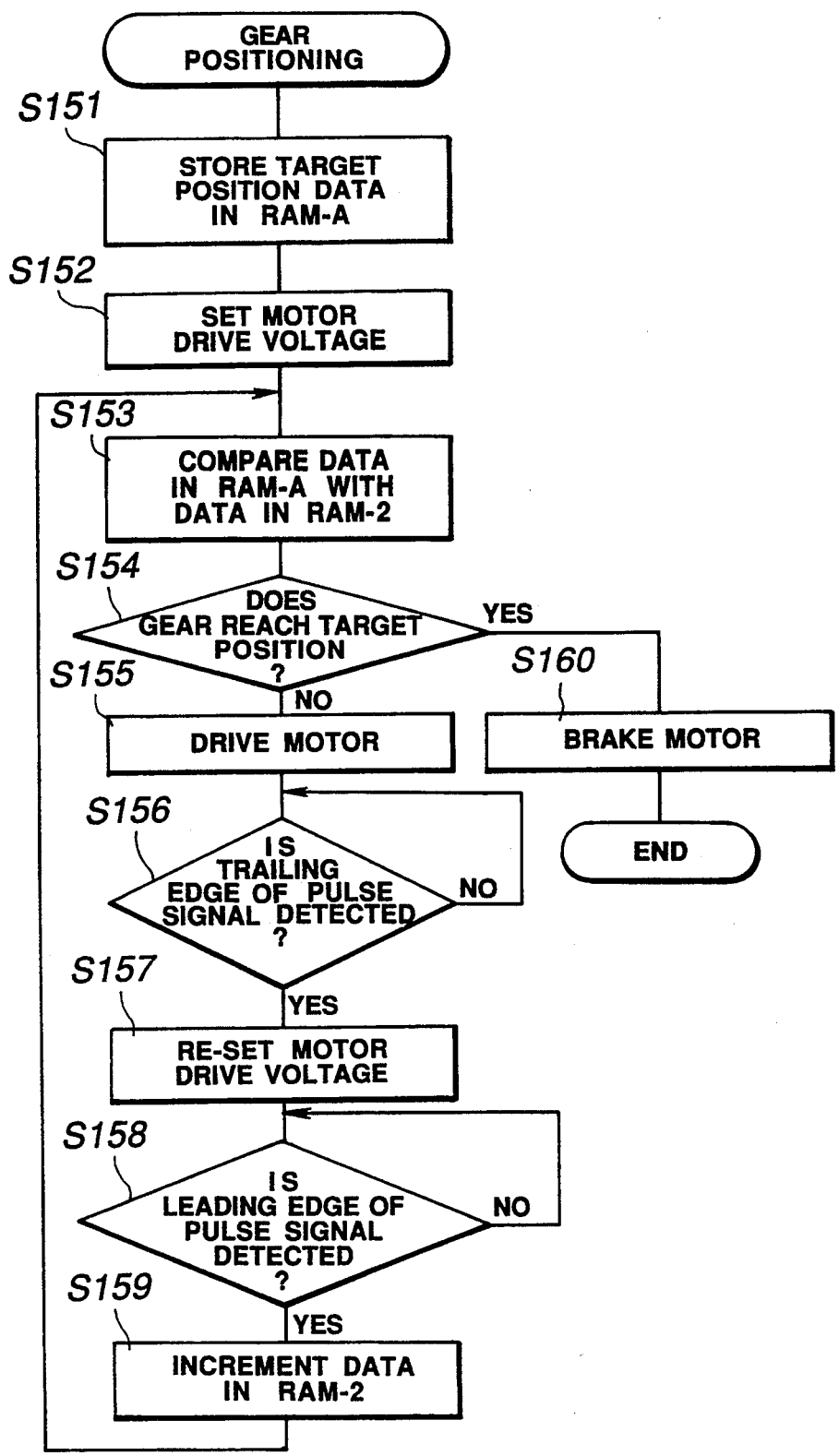
FIG. 15 is a flowchart showing a driving gear selection subroutine in the driving force transmission mechanism of FIG. 9.

FIG. 15 is a flowchart showing subroutine "Gear Positioning" or driven gear selection in the third embodiment. The flowchart will also be described as the operation of the CPU 301 in FIG. 5.

In the driven gear selection, first, a target position data of a driving system gear that is a driven gear is set in a RAM-A area in a RAM which is not shown (step S151). Thereafter, a motor drive voltage is set (step S152). The data in the RAM-A area is compared with the data in the RAM-2 area (steps S153 and S154). In other words, the target position of the driving system gear is compared with the current position of the ratchet wheel 103, or the planetary gear 104 or 104'. If it is found at the step S154 that the planetary gear 104 or 104' has reached the target position, the motor 101 (See FIG. 10) is braked to stop (step S160).

If it is found at the step S154 that the planetary gear 104 or 104' has not reached the target position, the motor 101 is further driven (step S155). The planetary gears 104 and 104' are revolved until the fall (trailing edge) of the pulse signal output by the photo-reflector 7 is detected (step S156).

If the fall of the pulse signal is detected at the step S156, the motor drive voltage is re-set (step S157). It is then determined whether the rise of the pulse signal is detected (step S158). Thereafter, the data in the RAM-2 area is incremented (step S159). Control then returns to the step S153.

Next, a driving force transmission mechanism of the fourth embodiment of the present invention will be described.

The driving force transmission mechanism of the fourth embodiment is fundamentally identical to that of the third embodiment but differs from that of third embodiment in driven gear selection. The same processing as that described above will not be described.

In the third embodiment, one of the planetary gears 104 and 104' is moved to a position permitting engagement with a driving system gear coupled with an intended driving system. When an attempt is made to reduce a time lag occurring in switching, either of the planetary gears located closer to an intended gear should be selected. The fourth embodiment takes up this idea. The control sequence will be described with reference to the flowchart of FIG. 16. Target position data D1 and D2 are used to select the same driving system gear. Since two planetary gears 104 and 104' reside, two target position data are used.

In this driven gear selection, first, the first target position data D1 of a driving system gear that is a driven gear is set in a RAM-A area in a RAM which is not shown (step S151). Next, the second target position data D2 is set in a RAM-B area (step S151'). Thereafter, a motor drive voltage is set (step S152). The data in the RAM-A area is compared with the data in the RAM-2 area described in conjunction with the flowchart of FIG. 14 (steps S153 and S154). In other words, the first target position data D1 of the driving system gear is compared with the current position data of the ratchet wheel 103, or the planetary gear 104 or 104'. If it is found at the step S154 that the planetary gear 104 or 104' has reached the first target position, the motor 101 is braked to stop (step S160).

If the RAM-A data is unequal to the RAM-2 data, the RAM-B data is compared with the RAM-2 data (steps S153' and S154'). In other words, the second target position data D2 of the driving system gear is compared with the current position data of the ratchet wheel 103, or the planetary gear 104 or 104'. If it is found at the step S154' that the planetary gear 104 or 104' has reached the second target position, the motor 101 is braked to stop (step S160).

If it is found at the step S154' that the planetary gear 104 or 104' has not reached the target position, the motor 101 is further driven (step S155). The planetary gears 104 and 104' are revolved until the fall (trailing edge) of the pulse signal output by the photo-reflector 7 is detected (step S156).

If the fall of the pulse signal is detected at the step S156, a motor drive voltage is re-set (step S157). It is determined whether the rise of the pulse signal is detected (step S158). Thereafter, the data in the RAM-2 area is incremented (step S159). Control then returns to the step S153'.

The aforesaid control sequence reduces a time lag occurring before the planetary gear 104 or 104' engages with any of the driving system gears 120, 121, 122, 123, and 124.

The aforesaid third and fourth embodiments are summarized below.

1) The motor 101 causes the gear 102a to rotate counterclockwise. Either the planetary gear 104 or 104' is moved to a position permitting engagement with a driven gear which is coupled with an intended driving system. The position is detected in an output signal sent from the photo-reflector PR7. - - - Driving system selection 2) The motor 101 causes the gear 102 to rotate clockwise. A driving force is transmitted to a driven gear, which is coupled with an intended driving system, via the planetary gear 104 or 104'. - - - Transmission of a driving force to a driving system Next, a driving force transmission mechanism incorporated in a camera will be described as a driving force transmission mechanism of the fifth embodiment of the present invention. The construction of the driving force transmission mechanism of this embodiment is identical to that of the third or fourth embodiment shown in FIG. 9. The electric circuits shown in the electric circuit diagram of FIG. 5 apply to the electric circuits for controlling the driving force transmission mechanism. Similar to those of the driving force transmission mechanism in the third or fourth embodiment, the CPU 301 is employed as a control CPU, the single motor 101 is employed as a driving source, and the photo-reflector 7 (PR7) is employed as a position detecting means. The other components are identical to those in the third or fourth embodiment.

Figure 17:
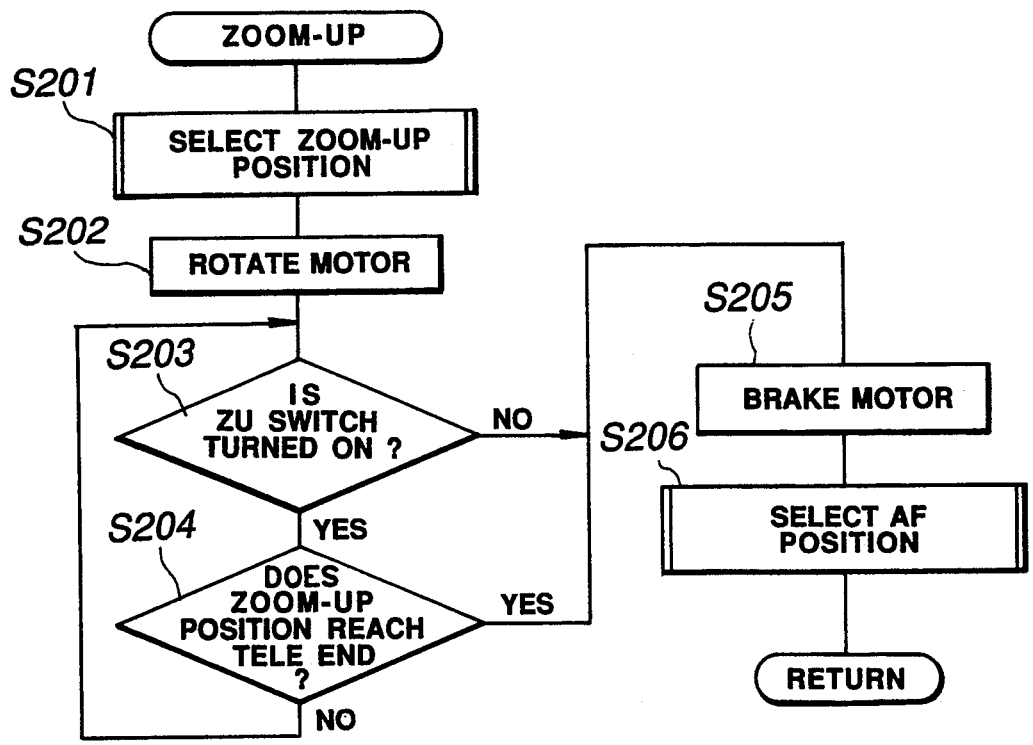
FIG. 17 is a flowchart of the subroutine "Zoom Up" in the photographic sequence of a camera with a built-in driving force transmission mechanism of the fifth embodiment of the present invention.
Figure 18:
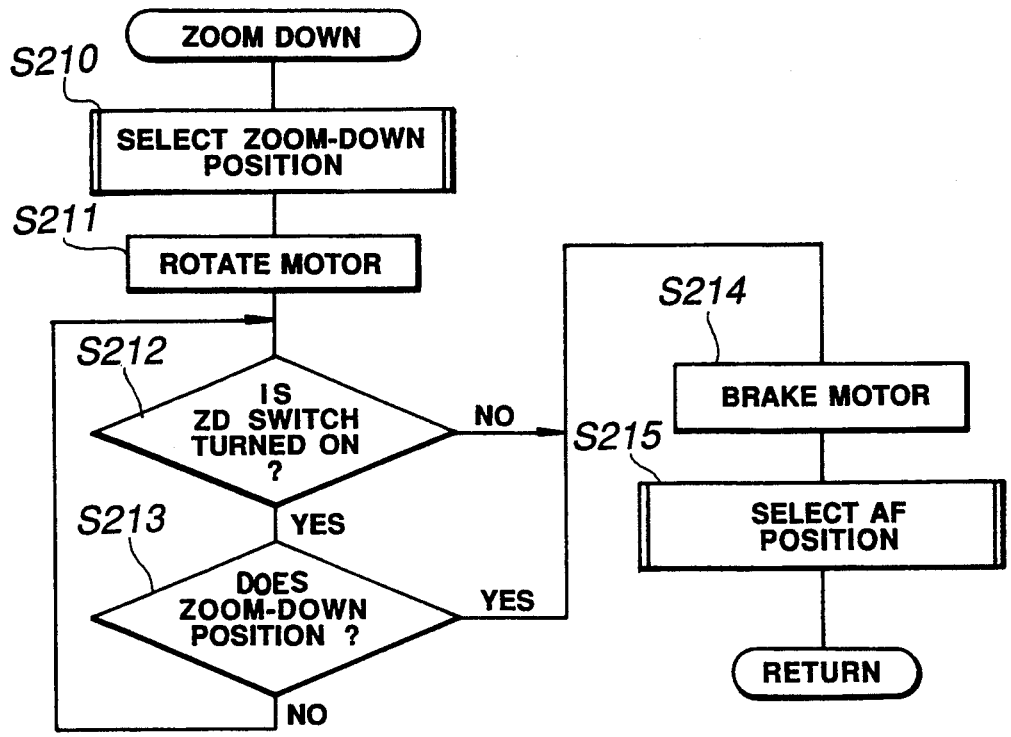
FIG. 18 is a flowchart of the subroutine "Zoom Down" in the photographic sequence of a camera of FIG. 17.

Zoom driving in the photographic sequence of a camera in which the driving force transmission mechanism of this embodiment is incorporated will be described on the basis of the zoom driving subroutine shown in FIGS. 17 and 18. FIG. 17 is a flowchart of zoom driving subroutine "Zoom Up." FIG. 18 is a flowchart of zoom driving subroutine "Zoom Down."

Figure 16:
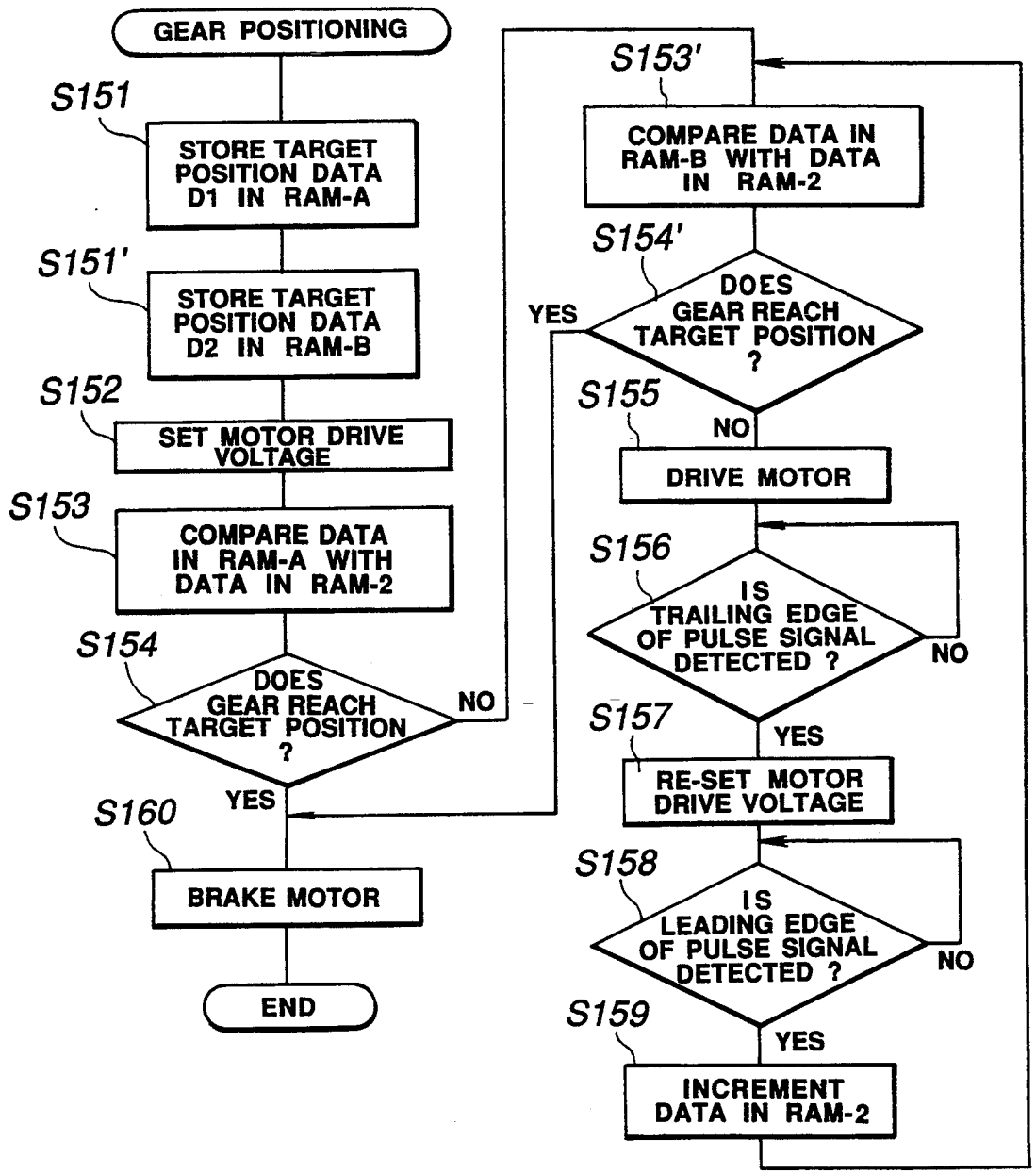
FIG. 16 is a flowchart showing a driving gear selection subroutine in the fourth embodiment of the present invention operation subroutine.

In zoom-up processing, first, a user turns on the zoom-up switch ZU shown in FIG. 5. The CPU 301 becomes aware of the fact within the main flow which is not shown. The subroutine "Zoom Up" shown in FIG. 9 is called. A position permitting engagement with the driving system gear for zoom up drive 124, which is a driven gear, is regarded as a target position, and then Gear Positioning shown in FIG. 16 is executed (step S201). After the driving system gear 124 is selected as an engagement destination, the motor 101 is driven and the gear 102a is rotated clockwise (step S202). This rotation drives a zoom lens in the zoom-up direction.

If it is detected that the user has released the zoom-up switch ZU or the zoom position has reached a Tele end, determination is made at steps S203 and S204. Control then passes to a step S205. The motor 101 is braked to stop zoom drive.

Thereafter, control passes to a step S206. A position at which either the planetary gear 104 or 104' engages with the driving system gear for AF lens drive 122, which is a driven gear, is regarded as target position data or an initial position in the next photographic sequence, and then Gear Positioning shown in FIG. 16 is executed. This causes the planetary gear 104 or 104' to move to the position enabling AF lens drive.

Zoom-down processing is also executed with the operation of the zoom-down switch ZD. Specifically, when the switch ZD is operated, the subroutine "Zoom Down" shown in FIG. 18 is called. Zoom Down is executed on the basis of the processing from a step S210 to a step S215. The processing differs from the processing of FIG. 17 only in the zooming direction.

After the aforesaid zoom-up or zoom-down processing is executed, when zooming is completed, the ratchet wheel 103 has rotated to the initial position; that is, the planetary gear 104 or 104' has moved to a position permitting engagement with the driving system gear for AF lens drive 122 that is a driven gear. The camera is ready to photograph. After the processing of film wind or film rewind which is not shown is executed, the ratchet wheel 103 is rotated to the initial position so as to select the position at which the planetary gear 104 or 104' engages with the driving system gear for AF lens drive 122 that is a driven gear. The camera then gets ready to photograph. Thus, a release time lag occurring during the next release can be reduced, which will be described later.

Next, release in the photographic sequence of a camera in which a driving force transmission system of this embodiment is incorporated will be described.

Figure 19:
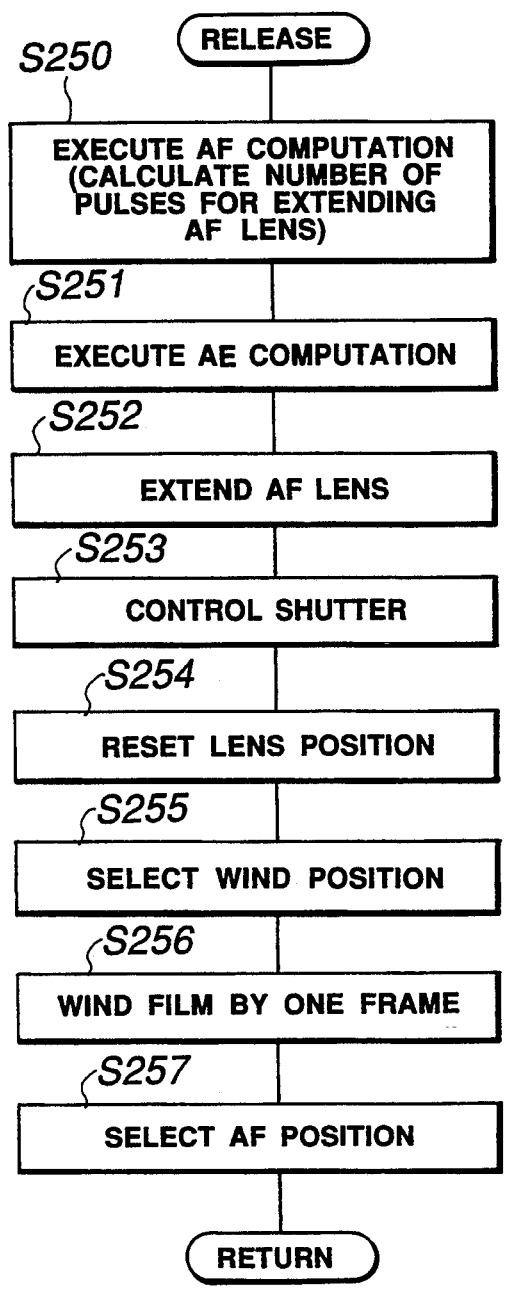
FIG. 19 is a flowchart of the subroutine "Release" in the photographic sequence of a camera of FIG. 17.

FIG. 19 is a flowchart of subroutine Release. When it is detected within the main flow, which is not shown, that the release switch 1R or 2R shown in FIG. 5 is turned on by a user, the subroutine "Release" is executed. First, an AF control block incorporated in the interface IC 4 shown in FIG. 5 is activated. AF computation is executed according to AF data supplied to the CPU 301, which provides the number of pulses for extending the AF lens (step S250). Next, AE computation is executed, which determines the seconds of a shutter speed (step S251).

Next, AF lens driving is executed according to the number of pulses for extending the AF lens which results from AF computation (step S252). Since the planetary gear 104 or 104' has already been moved to the selected AF lens drive position, driven gear selection need not be done. After AF lens drive terminates, shutter control is executed according to the seconds of exposure resulting from AE computation (step S253).

The time elapsing after the on state of the release switch 1R or 2R is detected until shutter control is executed is what is referred to as a release time lag, which is required to be as short as possible. In this embodiment, the planetary gear 104 or 104' is always set at an AF lens drive position in a photography standby state. Gear position selection is, therefore, omitted from release, which realizes reduction in the release time lag.

After shutter control terminates, AF lens reset is executed so as to drive the AF lens to the initial position (step S254). Then, Gear Positioning shown in FIG. 16 is executed so as to move the planetary gear 104 or 104' to the position of the driving system gear for wind drive 120 and engaged with the driving system gear 120 (step S255). Thereafter, one-frame wind is executed (step S256). Gear Positioning shown in FIG. 16 is then executed so as to return the planetary gear 104 or 104' to the initial position permitting engagement with the driving system gear for AF lens drive 122 (S257). The above operation completes a sequence of photographic operations.

Next, the control sequence relating to the on or off operation of the power switch PW in the camera of this embodiment will be described in conjunction with the flowcharts of FIGS. 20 and 21. These flowcharts are part of the main flow which is not shown.

Figure 20:
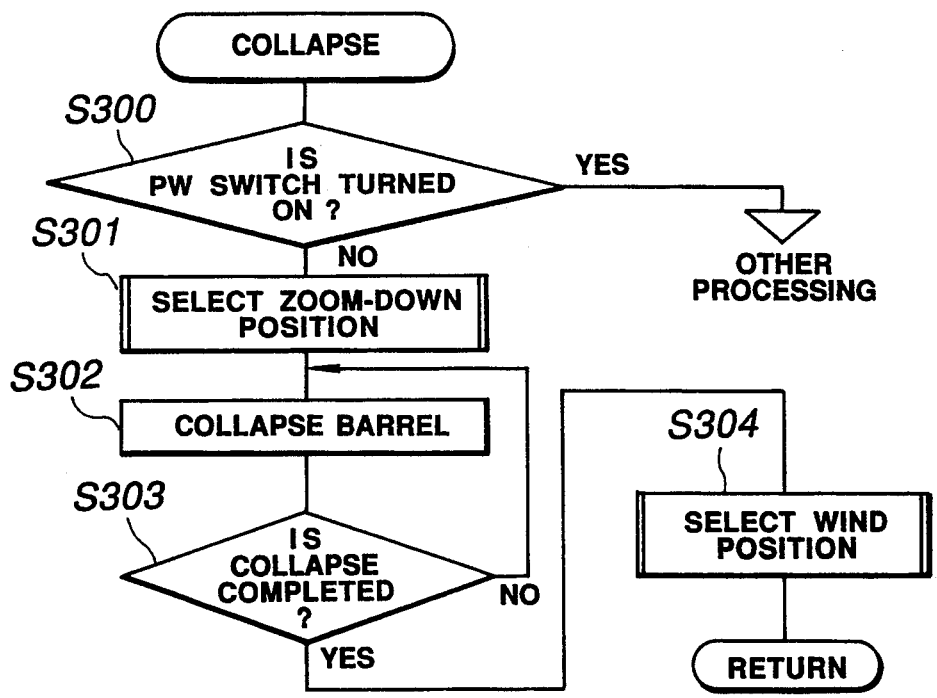
FIG. 20 is a flowchart of the subroutine "Barrel Collapse" in the photographic sequence of a camera of FIG. 17.

FIG. 20 is a flowchart of "Barrel Collapse" to be executed after the power switch PW is turned off. First, it is confirmed that a signal the power switch PW supplies to the CPU 301 represents an off voltage. Control then passes to a step S301. Gear Positioning shown in FIG. 16 is executed so as to rotate the planetary gear 104 or 104' which will be driven to a position permitting engagement with the driving system gear for zoom-down drive 123.

At steps S302 and 303, the driving system gear for zoom-down drive 123 is further driven until it reaches a barrel collapse position of a zoom lens. When Barrel Collapse is completed, control passes to a step S304. Gear positioning shown in FIG. 16 is executed so as to drive the planetary gear 104 or 104' to a position permitting engagement with the driving system gear for film wind 120. Then, this routine terminates.

When the power switch PW is off, the camera is, needless to say, not in operation but usually being carried. In this case, if the planetary gear 104 or 104' is engaging with the driving system gear for AF lens drive 122, the driving system gear for film wind 120 is held with frictional load reduced. If a large vibration propagates to the camera in this state, the surface of film loaded is displaced. As a result, part of film already exposed may be re-exposed during the next photography or a too wide space may be created between frames.

In this embodiment, as described above, when Barrel Collapse is in progress, the planetary gear 104 or 104' remains engaged with the driving system gear for film wind 120. An accident such as the aforesaid displacement of film due to a vibration occurring when frictional load has worked on the driving system gear 120 will not take place.

Figure 21:
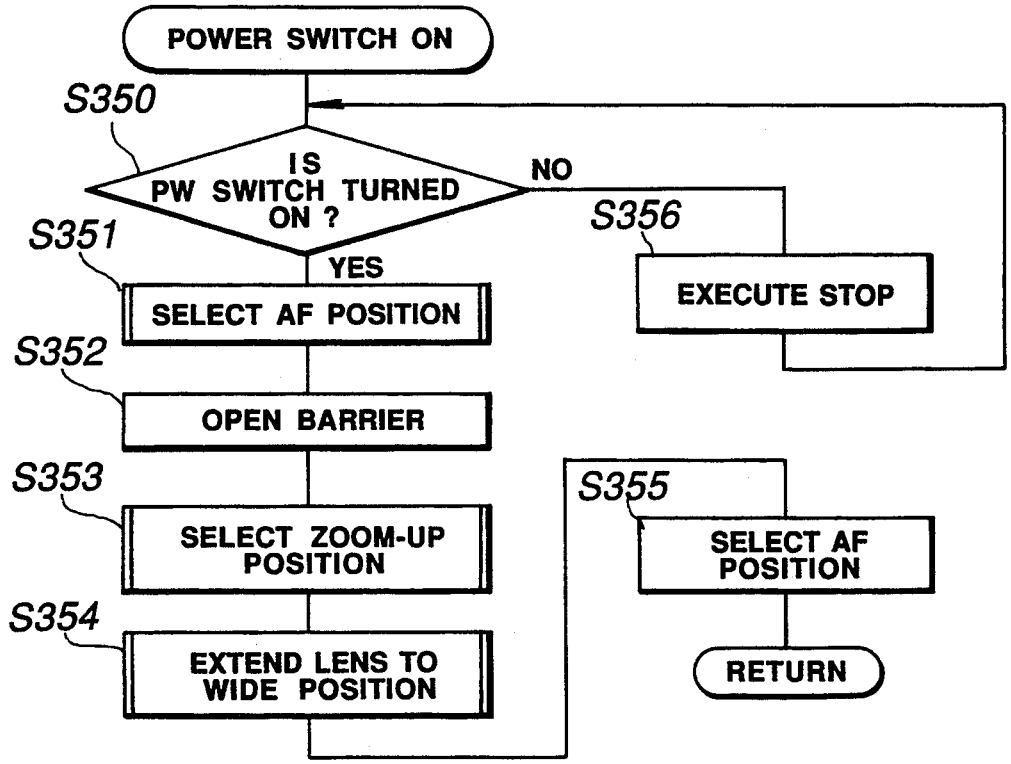
FIG. 21 is a flowchart of the subroutine "Power Switch On" in the photographic sequence of a camera of FIG. 17.

FIG. 21 is a flowchart of "Power Switch On" executed when the power switch PW on a camera shown in FIG. 5 is turned on. First, it is checked at a step S350 if the signal the power switch PW supplies to the CPU 301 is an on or off voltage. If the power switch PW is off, control jumps to the step S304 and de-energizing is carried out. If the power switch PW is on, control passes to a step S351. Gear Positioning shown in FIG. 16 is executed so as to rotate the planetary gear 104 or 104' which will move from the position permitting engagement with the driving system gear for film wind 120 to the position permitting engagement with the driving system gear for AF lens drive 122. At a step S352, the AF lens is driven. If the lens barrel is collapsed, a frame mechanism, which is not shown, releases the lens barrier located at the distal end of the zoom lens.

Gear Positioning shown in FIG. 16 is executed at steps S353 and 354 so as to rotate the planetary gear 104 or 104' which will move from the AF lens drive position to the zoom-up drive position. The zoom lens is then driven to the zoom Wide position. Thereafter, Gear Positioning shown in FIG. 16 is executed at a step S355, whereby the planetary gear 104 or 104' rotates to the AF lens drive position. This processing then terminates.

After the power switch PW is turned on, when the aforesaid processing is executed, the camera is placed in a state enabling AF lens drive. The succeeding photography can be executed swiftly.

What is claimed is:

1. A camera having a driving force transmission mechanism provided therein, comprising:
   a single motor;
   a sun gear selectively rotated in one of a forward and a reverse direction by said motor;
   a planetary gear engaging said sun gear;
   a plurality of driven gears each driving a different camera function and being arranged about a revolution orbit of said planetary gear and to which a driving force of said motor is selectively transmitted; and
   a selection driving means for selecting one of said driven gears, to be engaged by said planetary gear, responsive to revolving of said planetary gear due to rotation in one of said directions of said sun gear, and transmitting a driving force to said selected driven gear via said planetary gear responsive to rotation in the other one of said directions of said sun gear.

2. A camera according to claim 1, wherein said selection driving means comprises:
   an opening into which said sun gear is inserted, said opening having a center lying along an axis of rotation in common with that of said sun gear;
   a supporting axis for rotatably supporting said planetary gear as said planetary gear engages said sun gear;
   a wheel means having a plurality of notches, each notch having a first cam surface and a second cam surface provided on the outer circumference thereof;
   a click stop arranged to engage said notches on the outer circumference of said wheel such that said click stop permits rotation of said wheel when said sun gear is rotated in one of said forward and reverse directions by riding over said first cam surface, said click stop preventing rotation of said wheel by engaging said second cam surface when rotation of said sun gear is switched to the other of said directions; and
   a control means that controls a direction and amount of rotation of said motor.

3. A camera according to claim 2, wherein said click stop is a stop pin movable along a longitudinal axis and said second cam surface comprises a blocking wall that is substantially parallel to said longitudinal axis.

4. A camera according to claim 2, wherein said wheel means covers said sun gear when said sun gear is inserted in said opening and includes a cylindrical section having notches for enabling engagement of said sun gear with said planetary gear.

5. A camera according to claim 4, further comprising a plurality of blades sharing a common rotary axis with said wheel means and adapted to rotate with said wheel means, and a position detecting means for detecting a position of said planetary gear by detecting positions of said blades, and wherein said control means controls a direction and amount of rotation of said motor based on an output of said position detecting means.

6. A camera according to claim 2, further comprising a plurality of blades sharing a common rotary axis with said wheel means and adapted to rotate with said wheel means, and a position detecting means for detecting a position of said planetary gear by detecting positions of said blades, and wherein said control means controls a direction and amount of rotation of said motor based on an output of said position detecting means.

7. A camera according to claim 2, further comprising internal gears selectively engageable with said planetary gear to assist said planetary gear in revolving; said internal gears being located in spaces separating respective ones of the driven gears.

8. A driving force transmission mechanism according to claim 1, wherein said selection driving means comprises:
a planetary gear revolving means that includes a spindle for rotatably supporting said planetary gear, said spindle enabling revolution of said planetary gear upon rotation in one direction of said sun gear;
a position detecting means for detecting a position of said planetary gear revolving means;
a rotation hindering means that hinders said planetary gear revolving means from rotating in a direction opposite said one direction;
a plurality of driven gears such that, when rotation of said planetary gear revolving means is hindered by said rotation hindering means, one of said driven gears is rotated by said planetary gear upon rotation of the sun gear in the opposite direction; and
a control means that moves said planetary gear to a position permitting engagement with a specified driven gear in accordance with an output of said position detecting means, such that, when selection of a driven gear different from the specified driven gear is requested, the control means moves said planetary gear into engagement with said selected driven gear, and that when driving terminates, returns said planetary gear to an initial position.

9. A driving force transmission mechanism according to claim 8, wherein said specified driven gear is a gear whose location is defined as said initial position, said specified driven gear driving a focus lens.

10. A driving force transmission mechanism according to claim 8, wherein said control means includes means responsive to a power supply of a camera being off, for maintaining said planetary gear in engagement with a gear of said plurality of driven gears employed for film winding.

11. A driving force transmission mechanism according to claim 8, wherein said planetary gear revolving means includes a plurality of claws on an outer circumference thereof, a plurality of cam surfaces each arranged on one side of each claw;
said rotation hindering means includes a swingable lever means such that when said sun gear is rotating in said one direction, moves along a cam surface adjacent to a claw and permits the rotation of said sun gear revolving means, and such that when the rotation of said planetary gear is switched to the opposite direction in accordance with an output of said position detecting means, engages a claw to hinder rotation of said planetary gear revolving means.

12. A driving force transmission mechanism according to claim 11, wherein said position detecting means includes a photo-reflector means that detects a position of said planetary gear revolving means each time said lever means passes a claw.

13. A driving force transmission mechanism according to claim 1, wherein said selection driving means comprises:
a gear means that has a drive pin at a position spaced from a center of rotation of said gear means and engages said planetary gear which revolves with rotation in one direction of said sun gear;
a driving force transmitting means that engages said planetary gear with rotation in the opposite direction of said sun gear and transmits the driving force of said sun gear to any of said driven gears; and
a lever means swingable about a fixed pivot and that includes an elongated groove with which the drive pin of said first gear means engages so that the drive pin slides freely in said groove, and a cam which is formed at an end of said lever means facing said driven gears to move said driving force transmitting means to engage a specified one of said driven gears, and such that when said drive pin moves within said elongated groove with the rotation of said gear means, said lever means rotates about said fixed pivot and moves said driving force transmitting means into selective engagement with said driven gears.

14. A driving force transmission mechanism according to claim 13, further comprising position detecting means for detecting an angular position of said lever means, and a control means controlling said motor in such a manner that said driving force transmitting means will engage a specified one of said driven gears responsive to an output of said position detecting means.

15. A driving force transmission mechanism according to claim 14, wherein said position detecting means is composed of a plurality of holes in said lever means and a photo-interrupter located so as to selectively confront said holes.

16. A driving force transmission mechanism according to claim 13, further comprising a stopper means such that when said planetary gear revolves toward engagement with said gear means due to rotation in one direction of said sun gear, said stopper mans is displaced from said gear means enabling rotation of said gear means, and such that when said planetary gear revolves toward engagement with said driving force transmitting means due to rotation in an opposite direction of said sun gear, said stopper means hinders rotation of said gear means.

17. A camera according to claim 1 wherein at least three driven gears are provided for respectively driving three different camera functions.

18. A camera according to claim 17 wherein the three driven gears respectively drive a film winding mechanism, a film rewinding mechanism and an automatic focusing mechanism.

19. A camera having a driving force transmission mechanism, comprising:
- a single motor;
- a sun gear rotatable in a forward or a reverse direction by said motor;
- a planetary gear engaging said sun gear;
- a prohibiting means adapted to permit said planetary gear to revolve about said sun gear when said sun gear rotates in a first direction, and to prohibit said planetary gear from rotating when rotation of said motor is switched to an opposite direction; and
- a first transmitting gear for transmitting a driving force to a film winding mechanism when coupled to said planetary gear;
- a second transmitting gear for transmitting driving force to a film rewinding mechanism when coupled to said planetary gear;
- a third transmitting gear for transmitting a driving force to an automatic focusing mechanism when coupled to said planetary gear;
- a control means controlling said motor to select one of said first, second and third transmitting gears for engagement with said planetary gear when said sun gear rotates in said one direction in which said planetary gear revolves about said sun gear, and, thereafter, when said sun gear rotates in said opposite direction in which said planetary gear is prohibited from revolving, is adapted to transmit a driving force to said selected transmitting gear.

20. A driving force transmission mechanism according to claim 19, wherein said prohibiting means comprises:
- a wheel means having a plurality of notches, each notch having a first cam surface and a second sam surfaces on the outer circumference thereof;
- said wheel means having an opening for receiving said sun gear, a center of said opening lying on an axis of rotation of said sun gear;
- means for rotatably supporting said planetary gear as said planetary gear engages said sun gear; and
- a stop pin position to ride on said cam surfaces of said notches as said wheel means rotates, said stop pin being movable in an optical axis of said camera, said stop pin riding on said first cam surfaces so as to permit rotation of said wheel means when said sun gear rotates in said first direction, said stop pin engaging a vertical wall on said second cam surface on one of said notches to thereby prevent rotation of said wheel means when said sun gear rotates in said opposite direction.

21. A driving force transmission mechanism according to claim 20, further comprising a plurality of blades sharing a rotary axis with said wheel means and rotating with said wheel means, and a position detecting means for detecting a position of said planetary gear by detecting positions of said blades.

22. A driving force transmission mechanism of a camera according to claim 21, wherein one of said first, second and third transmitting gears is selected by said control means which includes means for advancing said planetary gear to an initial position responsive to an initial position output of said position detecting means indicating rotation to said initial position, means for advancing said planetary gear to a second position responsive to a transmitting gear position output indicating a position of a transmitting gear associated with the transmitting gear position output, said planetary gear engaging and driving said selected transmitting gear when said planetary gear is in said second position and said sun gear is rotated in said opposite direction.

23. A driving force transmission mechanism of a camera according to claim 22, wherein said selected transmitting gear is in said initial position is said third transmitting gear for driving a focusing lens.

24. A driving force transmission mechanism of a camera according to claim 21, wherein said control means maintains said planetary gear in engagement with said first transmitting gear for winding film when a power supply of said camera is turned off.

25. A driving force transmission mechanism of a camera according to claim 19, wherein said prohibiting means comprises:
- a one-way clutch means consisting of a ratchet wheel for rotatably supporting said planetary gear and a non-return lever for preventing rotation of said ratchet wheel; and
- a position detecting means having a photo-reflector means for detecting a position of said planetary gear on said wheel means each time said non-return lever engages said ratchet wheel.

26. A driving force transmission mechanism according to claim 20, wherein said prohibiting means comprises:
- first gear means having a drive pin at a position displaced from a center of rotation of said prohibiting means, said first gear means revolving due to rotation of said sun gear in one direction to engage said planetary gear;
- driving force transmitting means engaging said planetary gear due to rotation of said sun gear in an opposite direction for transmitting a driving force of said sun gear to one of said first, second and third transmitting gears via said planetary gear; and
- a lever means having a cam that is formed at an elongated groove, said elongated groove slidably engaging a drive pin of said first transmitting gear at a side end of said transmitting gear, said drive pin moving within said elongated groove upon rotation of said first gear transmitting means, to rotate said lever means in a camera body so that said driving force transmitting means is engaged with said selected one of said first, second and third transmitting gears.

27. A driving force transmission mechanism of a camera according to claim 26, wherein said prohibiting means further comprises rotatable position detecting means for detecting an angular position of said lever means and wherein said control means controls said motor to engage said driving force transmitting means with said selected one of said first, second and third transmitting gears responsive to an output of said position detecting means.

28. A driving means transmission mechanism according to claim 27, wherein said position detecting means is composed of a plurality of holes in said lever means and a photo-interrupter positioned to be selectively aligned with each of said holes.

29. A driving force transmission mechanism according to claim 26, wherein said prohibiting means further includes:
- a stopper means that is displaced from said first gear means when said planetary gear revolves toward engagement with said first gear means due to rotation in one direction of said sun gear, enabling rotation of said first gear means, and hinders rotation of said first gear means when said planetary gear revolves toward engagement with said driving force transmitting means due to rotation in an opposite direction of said sun gear.

30. A driving force transmission mechanism of a camera according to claim 22 wherein said control means further comprises means for moving said planetary gear to said initial position responsive to termination of rotation of said sun gear in said other direction.

31. A method for operating a driving force transmission mechanism for controlling at least two different camera functions comprised of a planetary gear mechanism including a rotatable sun gear and a planetary gear rotatably mounted upon a wheel and engaging said sun gear and revolvable with said wheel about an orbit having a center of rotation coinciding with the center of rotation of said sun gear and being rotatable about a center of rotation of said planetary gear, a motor for rotating said sun gear, and at least two driven gears arranged at spaced intervals about said orbit for selective engagement with said planetary gear, said method comprising the steps of:
  (a) operating said motor to rotate said sun gear in a first direction whereby said wheel causes said planetary gear to move along said orbit for sequential engagement with each of said driven gears;
  (b) halting said motor when said planetary gear is in engagement with a selected one of said driven gears;
  (c) rotating said motor in an opposite direction;
  (d) restraining said wheel from moving along said orbit responsive to rotation of said motor in said opposite direction thereby limiting said planetary gear to only rotation about its axis, said rotation of said planetary gear due to rotation of said sun gear being transferred to said selected one of said driven gears engaging said planetary gear to perform a selected one of the camera functions.

32. The method of claim 31 wherein step (a) further comprises the step of:
- identifying a position of one of the driven gears as an initial position by a first predetermined indicia and identifying positions of the remaining driven gears by similar second indicia which are different from said first predetermined indicia;
- identifying the position of each driven gear by detecting the indicia for a driven gear to be selected by counting its position from said initial indicia; and
- stopping rotation of the motor responsive to a given count representing the driven gear to be selected.

33. The method of claim 32 further comprising the step of:
  (e) operating the motor to revolve the planetary gear in one direction to said initial position responsive to completion of an operation performed by a previously selected driven gear.

34. The method of claim 32 further comprising the step of:
- initially operating the motor to rotate said sun gear in said one direction so as to engage a predetermined driven gear when a power on condition of a power source for the motor is detected.

35. The method of claim 32 further comprising the step of:
- initially operating the motor to rotate said sun gear in said one direction so as to engage a predetermined driven gear when a power off condition is detected.

36. The method of claim 32 wherein said indicia comprises openings in said rotating member, said initial opening identifying said initial position being of a size different from the remaining openings each identifying positions of associated driven gears, and further comprising the step of:
- determining the location of said initial position by detection of the opening associated therewith.

37. A method for operating a driving force transmission mechanism comprised of a planetary gear mechanism including a rotatable sun gear and a pair of planetary gears arranged at spaced intervals about the sun gear and engaging said sun gear and revolvable about a common orbit having a center of rotation coinciding with a center of rotation of said sun gear each planetary gear being rotatable about a center of rotation of each planetary gear, a motor for rotating said sun gear, and a plurality of driven gears arranged at spaced intervals about said orbit for selective engagement with either of said planetary gears, said method comprising the steps of:
  (a) operating said motor to rotate said sun gear in a first direction whereby said planetary gears move along said orbit for sequential engagement with each of said driven gears;
  (b) halting said motor when one of said planetary gears is in engagement with a selected one of said driven gears;
  (c) rotating said motor in an opposite direction;
  (d) restraining said planetary gears from moving along said orbit responsive to rotation of said motor in said opposite direction thereby limiting said planetary gears to rotation about their central axes, said rotation of at least one of said planetary gears due to rotation of said sun gear being transferred to a selected driven gear engaging said at least one of said planetary gears.

38. The method of claim 37 further comprising the steps of:
  (e) determining the positions of said planetary gears;
  (f) determining the distances of said planetary gears from a position of a driven gear to be selectively engaged by one of said planetary gears; and
  (g) operating the motor to rotate the sun gear in said first direction by an angular amount to bring a planetary gear closer to the driven gear to be selected when measured in said first direction to reduce the time required to couple driving power to a selected driven gear in moving the sun gear from a position occupied prior to selection of a desired driven gear.

39. A method for operating a force transmission mechanism comprised of first and second planetary gear arrangements each being comprised of a sun gear rotatable about a center axis and a planetary gear revolvable about an orbit whose central axis is common with the central axis of its associated sun gear;
- a driven gear selecting member positioned along the orbit of the planetary gear of said first planetary gear arrangement, the planetary gear of said second planetary gear arrangement also being positioned along the orbit of the planetary gear of said first planetary gear arrangement and cooperating with said driven gear for selective engagement with the first planetary gear;

a plurality of driven gears arranged at spaced intervals along the orbit of said second planetary gear;

a lever swingably mounted about a stationary pivot point and having a first end for moving said second planetary gear into engagement with a selected one of said plurality of driven gears, said lever having an elongated slot;

a pin on said gear selecting member displaced from a center of rotation of said gear selecting member for slidably engaging said elongated slot in said lever, said method comprising the steps of:

(a) operating the motor driving said first sun gear in a first direction to cause said first planetary gear to engage and rotate said gear selecting member whereupon said lever is swung about its pivot to move said second planetary gear into engagement with said selected one of said driven gears;

(b) stopping said motor when the lever has moved the second planetary gear into engagement with the desired driven gear;

(c) operating said motor to rotate said first sun gear in a second direction causing said first planetary gear to engage and rotate said second sun gear for transferring driving force to the selected driven gear engaging the second planetary gear.

40. The method of claim 39 further comprising the step of hindering rotation of the gear selecting member when said first sun gear is rotated in said second direction.

41. The method of claim 39 further comprising providing position identifying indicia on said lever each indicia associated with a position of one of said driven gears, said method further comprising the step of:

detecting said indicia and stopping said motor responsive to detection of a given one of said indicia.

* * * * *